(12) United States Patent
Kiffner et al.

(10) Patent No.: US 10,216,062 B2
(45) Date of Patent: Feb. 26, 2019

(54) ELECTROMAGNETIC FREQUENCY CONVERTER

(71) Applicant: OXFORD UNIVERSITY INNOVATION LIMITED, Oxford (GB)

(72) Inventors: Martin Kiffner, Oxford (GB); Amir Feizpour, Oxford (GB); Joshua Nunn, Oxford (GB)

( * ) Notice: Subject to any disclaimer, the term of this patent is extended or adjusted under 35 U.S.C. 154(b) by 0 days.

(21) Appl. No.: 16/063,845

(22) PCT Filed: Dec. 20, 2016

(86) PCT No.: PCT/GB2016/054000
§ 371 (c)(1),
(2) Date: Jun. 19, 2018

(87) PCT Pub. No.: WO2017/109475
PCT Pub. Date: Jun. 29, 2017

(65) Prior Publication Data
US 2018/0373118 A1    Dec. 27, 2018

(30) Foreign Application Priority Data

Dec. 22, 2015 (GB) .................................. 1522640.0

(51) Int. Cl.
*G02F 1/35* (2006.01)
(52) U.S. Cl.
CPC ........ *G02F 1/3536* (2013.01); *G02F 2201/05* (2013.01); *G02F 2203/13* (2013.01); *G02F 2203/21* (2013.01)

(58) Field of Classification Search
CPC ............... G01F 1/3536; G01F 2201/05; G01F 2203/13; G01F 2203/21
See application file for complete search history.

(56) References Cited

U.S. PATENT DOCUMENTS

| 3,720,882 A | 3/1973 | Tang et al. |
| 5,771,117 A | 6/1998 | Harris et al. |
| (Continued) | | |

OTHER PUBLICATIONS

B. Huber et al., "Motion-induced signal revival in pulsed Rydberg four-wave mixing beyond the frozen-gas limit", Physical Review A (Atomic, Molecular, and Optical Physics), vol. 90, No. 5, Nov. 3, 2014, pp. 053806-1 to 053806-6. (Year: 2014).*

(Continued)

*Primary Examiner* — Daniel Petkovsek
(74) *Attorney, Agent, or Firm* — Withrow & Terranova, P.L.L.C.; Vincent K. Gustafson

(57) ABSTRACT

An electromagnetic frequency converter includes an atomic ensemble; one or more first sources (6, 8) of electromagnetic radiation (P, R) to be incident upon the atomic ensemble to excite atomic valence electrons from a ground state to a first Rydberg state; one or more second sources (6, 14) of electromagnetic radiation (A, C) to be incident upon the atomic ensemble to excite atomic valence electrons from an excited state to a second Rydberg state; a first input (20) and/or output (26) for electromagnetic radiation (L) to be incident upon the atomic ensemble from the first input or received from the atomic ensemble at the first output; and a second input (14) and/or output (24) for electromagnetic radiation (M) to be incident upon the atomic ensemble from the second input or received from the atomic ensemble at the second output.

21 Claims, 6 Drawing Sheets

(56) References Cited

U.S. PATENT DOCUMENTS

| | | | | |
|---|---|---|---|---|
| 6,525,868 B2* | 2/2003 | Merriam | ............... | G02F 1/3534 |
| | | | | 359/326 |
| 7,672,342 B2* | 3/2010 | Gohle | ..................... | G02F 1/353 |
| | | | | 372/21 |
| 2009/0074016 A1* | 3/2009 | Marner | .................. | G01J 3/108 |
| | | | | 372/22 |

OTHER PUBLICATIONS

Ackermann, P., et al., "Strong quantum interferences in frequency up-conversion towards short vacuum-ultraviolet radiation pulses," Physical Review A, vol. 89, No. 063804, Jun. 10, 2014, 7 pages.

Fan, H. Q., et al., "Sub-wavelength microwave electric field imaging using Rydberg atoms inside atomic vapor cells," Optics Letters, vol. 39, No. 10, May 15, 2014, pp. 3030-3033.

Kiffner, M., et al., "Two-way conversion of microwave and terahertz radiation into optical fields in Rydberg gases," Cornell University Library, Available online at: <<https://arxiv.org/pdf/1601.07100v2>>, May 26, 2016, 12 pages.

Kiffner, M., et al., "Two-way interconversion of millimeter-wave and optical fields in Rydberg gases," New Journal of Physics, vol. 18, No. 9, Sep. 15, 2016, 12 pages.

De Melo, N. R., et al., "Two-photon resonant forward four-wave mixing in rubidium vapor involving Rydberg states," Journal of the Optical Society of America, vol. 31, No. 7, Jul. 2014, pp. 1735-1740.

Search Report under Section 17(5) for United Kingdom Patent Application No. GB1522640.0, dated Jun. 17, 2016, 3 pages.

International Search Report and Written Opinion for International Patent Application No. PCT/GB2016/054000, dated Mar. 7, 2017, 14 pages.

\* cited by examiner

ELECTROMAGNETIC FREQUENCY CONVERTER

This application is a 35 U.S.C. § 371 national phase filling of International Application No. PCT/GB2016/054000 filed on Dec. 20, 2016, and claims the benefit of United Kingdom Patent Application No. 1522640.0 filed on Dec, 22, 2015, wherein the disclosures of the foregoing application are hereby incorporated by reference herein in their respective entireties.

This invention relates to an electromagnetic frequency converter in particular to a microwave to optical converter.

In fields of telecommunications, opto-electronics and quantum computing, for example, there is a desire to have efficient conversion of microwaves to optical frequencies (and vice versa) in order to link the microwave and optical regimes of the electromagnetic spectrum. Microwaves are conveniently used in electronic devices and quantum information processing systems owing to their strong non-linear coupling, while optical frequencies are conveniently used for the transmission of information owing to the long distances that such information can be transmitted with very high information density while suffering negligible thermal noise at room temperature (optical frequencies are good carriers for data).

Existing microwave to optical converters, e.g. based on opto-mechanical transduction or frequency mixing in A-type atomic ensembles, require the use of high-quality, frequency-selective cavities. This limits the bandwidth available for the conversion frequencies. Furthermore, such devices require aggressive cooling or optical pumping to bring the conversion devices into their quantum ground states, and their efficiency is rather low (e.g. less than 10%).

The aim of the present invention is to provide an improved device for converting between different electromagnetic frequencies.

When viewed from a first aspect the invention provides an electromagnetic frequency converter for converting input electromagnetic radiation to output electromagnetic radiation of a different frequency, the electromagnetic frequency converter comprising:

an atomic ensemble;

one or more first sources of electromagnetic radiation each having a frequency selected from a set of possible atomic transition frequencies for the atomic valence electrons in the atomic ensemble, wherein the sum of the frequencies of the one or more first sources is between 600 THz and 1500 THz, wherein the electromagnetic radiation from the one or more first sources is arranged to be incident upon the atomic ensemble to excite atomic valence electrons in the atomic ensemble from a ground state to a first Rydberg state;

one or more second sources of electromagnetic radiation each having a frequency selected from a set of possible atomic transition frequencies for the atomic valence electrons in the atomic ensemble, wherein the sum of the frequencies of the one or more second sources is between 300 THz and 750 THz, wherein the electromagnetic radiation from the one or more second sources is arranged to be incident upon the atomic ensemble to excite atomic valence electrons in the atomic ensemble from an excited state to a second Rydberg state, wherein the excited state is linked to the ground state by an atomic transition having a frequency between 193 THz and 800 THz for the atomic valence electrons in the atomic ensemble, and the second Rydberg state is linked to the first Rydberg state by an atomic transition having a frequency between 300 MHz and 3 THz for the atomic valence electrons in the atomic ensemble;

a first input and/or output for electromagnetic radiation having a frequency between 193 THz and 800 THz, wherein the first input or output is arranged to be coupled to the atomic ensemble such that the electromagnetic radiation is incident upon the atomic ensemble from the first input or received from the atomic ensemble at the first output; and a second input and/or output for electromagnetic radiation having a frequency between 300 MHz and 3 THz, wherein the second input or output is arranged to be coupled to the atomic ensemble such that the electromagnetic radiation is incident upon the atomic ensemble from the second input or received from the atomic ensemble at the second output;

wherein the electromagnetic frequency converter is arranged such that on application of the one or more first and one or more second sources of electromagnetic radiation to be incident upon the atomic ensemble, input of electromagnetic radiation having a frequency between 193 THz and 800 THz from the first input and which couples to the atomic transition between the ground state and the excited state or input of electromagnetic radiation having a frequency between 300 MHz and 3 THz from the second input and which couples to the atomic transition between the first Rydberg state and the second Rydberg state, causes electromagnetic radiation having a frequency between 300 MHz and 3 THz from the atomic transition between the second Rydberg state and the first Rydberg state to be output from the second output or electromagnetic radiation having a frequency between 193 THz and 800 THz from the atomic transition between the excited state and the ground state to be output from the first output respectively.

When viewed from a second aspect the invention provides a method of converting input electromagnetic radiation to output electromagnetic radiation of a different frequency, the method comprising:

exciting atomic valence electrons in an atomic ensemble from a ground state to a first Rydberg state by arranging for electromagnetic radiation from one or more first sources of electromagnetic radiation to be incident upon the atomic ensemble, wherein the frequency of each of the one or more first sources of electromagnetic radiation is selected from a set of possible atomic transition frequencies for the atomic valence electrons in the atomic ensemble and the sum of the frequencies of the one or more first sources is between 600 THz and 1500 THz;

exciting atomic valence electrons in the atomic ensemble from an excited state to a second Rydberg state by arranging for electromagnetic radiation from one or more second sources of electromagnetic radiation to be incident upon the atomic ensemble, wherein the excited state is linked to the ground state by an atomic transition having a frequency between 193 THz and 800 THz for the atomic valence electrons in the atomic ensemble, and the second Rydberg state is linked to the first Rydberg state by an atomic transition having a frequency between 300 MHz and 3 THz for the atomic valence electrons in the atomic ensemble, and wherein the frequency of each of the one or more second sources of electromagnetic radiation is selected from a set of possible atomic transition frequencies for the atomic valence electrons in the atomic ensemble and the sum of the frequencies of the one or more second sources is between 300 THz and 750 THz;

inputting electromagnetic radiation having a frequency between 193 THz and 800 THz or between 300 MHz and 3 THz to the atomic ensemble such that the electromagnetic radiation is incident upon the atomic ensemble;

wherein the atomic ensemble is arranged such that on application of the one or more first and one or more second sources of electromagnetic radiation to be incident upon the atomic ensemble, input of electromagnetic radiation having a frequency between 193 THz and 800 THz from the first input and which couples to the atomic transition between the ground state and the excited state or input of electromagnetic radiation having a frequency between 300 MHz and 3 THz from the second input and which couples to the atomic transition between the first Rydberg state and the second Rydberg state, causes electromagnetic radiation having a frequency between 300 MHz and 3 THz from the atomic transition between the second Rydberg state or electromagnetic radiation having a frequency between 193 THz and 800 THz from the atomic transition between the excited state and the ground state to be output from the atomic ensemble respectively.

The present invention therefore provides a frequency converter for converting electromagnetic radiation of one frequency that is input into the converter into electromagnetic radiation of a different frequency that is output from the converter. The converter includes an atomic ensemble that is used to perform the conversion between the different frequencies, with the atomic ensemble being driven by at least two sources of electromagnetic radiation to put the atomic ensemble into an, e.g. coherent, superposition of states, such that the conversion is performed, as will be described.

The atomic ensemble is arranged to have incident upon it electromagnetic radiation from at least two different sources, with each source providing electromagnetic radiation having a frequency selected from a set of possible atomic transition frequencies for the atomic valence electrons in the atomic ensemble. The one or more first sources input electromagnetic radiation having a summed frequency of between 600 THz and 1500 THz. The one or more second sources input electromagnetic radiation having a summed frequency of between 300 THz and 750 THz. The one or more first sources are arranged to excite atomic valence electrons in the atomic ensemble from their ground state to a first highly excited Rydberg state. The one or more second sources are arranged to excite atomic valence electrons in the atomic ensemble from an excited state to a second highly excited Rydberg state. The excited state is linked to the ground state by an atomic transition having a frequency between 193 THz and 800 THz for the atomic valence electrons in the atomic ensemble. The second Rydberg state is linked to the lower, first Rydberg state by an atomic transition having a frequency between 300 MHz and 3 THz for the atomic valence electrons in the atomic ensemble.

With the atomic ensemble prepared in this way, electromagnetic radiation having a frequency between 193 THz and 800 THz (i.e. optical or near-infrared radiation) is input to be incident upon the atomic ensemble via the first input, or electromagnetic radiation having a frequency between 300 MHz and 3 THz (i.e. microwave or terahertz radiation) is input to be incident upon the atomic ensemble via the second input. As will be described, the incident radiation is converted from an optical (or near-infrared) frequency to a microwave (or terahertz) frequency or vice versa.

In the case of optical or near-infrared radiation (between 193 THz and 800 THz) being input into the atomic ensemble via the first input, this couples to atomic transitions between the ground state and the excited state for atomic valence electrons in the atomic ensemble, i.e. the excited state is a relatively low-lying excited state, linked to the ground state by an optical or near-infrared transition. This induces corresponding atomic transitions for atomic valence electrons in the atomic ensemble between the first Rydberg state and the higher second Rydberg state, which causes microwave or terahertz radiation (between 300 MHz and 3 THz) to be output from the atomic ensemble via the second output.

In the case of microwave or terahertz radiation (between 300 MHz and 3 THz) being input into the atomic ensemble via the second input, this couples to atomic transitions via the first Rydberg state and the higher second Rydberg state for atomic valence electrons in the atomic ensemble. This induces corresponding atomic transitions for atomic valence electrons in the atomic ensemble between the ground state and the excited state, which causes optical or near-infrared radiation (between 193 THz and 800 THz) to be output from the atomic ensemble via the first output.

Thus it will be appreciated that the electromagnetic frequency converter of the present invention links the manifold of highly excited Rydberg states of the atomic ensemble (between which microwave or terahertz frequency atomic transitions are present) and the lower lying optical or near-infrared atomic transitions of the atomic ensemble, in order to convert microwave or terahertz radiation into optical or near-infrared radiation (or vice versa). The Rydberg states are highly excited and thus close to the ionisation potential of the atoms in the atomic ensemble. The valence electrons in these Rydberg states have a very large orbit, very far out from the nucleus and the other non-valence electrons. Therefore the atomic ensemble, when prepared in this way, contains many (e.g. identical) large electric dipoles that couple strongly to microwave or terahertz radiation and therefore there is a relatively high probability that the incident microwave or terahertz radiation will be absorbed by one of the many atomic transitions in the Rydberg manifold of states.

Furthermore, there is a strong optical dipole coupling between the incident optical or near-infrared radiation and the transition for atomic valence electrons in the atomic ensemble between the ground state and the excited state. The atoms in the Rydberg states and the atoms in the ground state may therefore be driven by respective external fields (the one or more second sources of, e.g. optical or near-infrared, radiation and the one or more first sources of, e.g. optical or near-infrared, radiation) to link the excited state with the Rydberg states, to produce a large collective response, thus providing an efficient mechanism for frequency conversion.

Furthermore, the decay rates of the Rydberg states are relatively small owing to the small overlap of the wavefunction of these states with the wavefunction of low lying electronic states. This means that the lifetime, and thus coherence time, of the Rydberg states is relatively long, which increases the efficiency of the conversions. For example, the lifetime of some of the Rydberg states is approximately 10 µs to 100 µs, which can be several hundred times longer than the lifetime of the low-lying excited state.

Owing to the strong coupling of the incident radiation to both the microwave or terahertz and optical or near-infrared transitions of the atomic ensemble, and the long coherence time of the Rydberg states, thus giving an efficient frequency conversion mechanism, the converter of the present invention does not need to use a cavity, as has been necessary in existing converters. As no cavity is required in the converter of the present invention, the bandwidth available for conversion frequencies can be much larger.

Furthermore, the converter of the present invention preferably does not require any optical pumping (e.g. in addition to the electromagnetic radiation from the one or more first and one or more second third sources) because the highly excited Rydberg states are not thermally populated (e.g. at room temperature) so there is very little, if any, thermal noise to suppress and therefore no need for optical pumping to keep these states empty. The converter also does not require any micro-fabrication of components because the active component of the converter is simply a volume of atoms to which radiation is applied.

This contrasts to existing converters which rely on low energy transitions in low lying (small-n, where n is the principal quantum number) states. These low lying states are highly populated which generates a lot of thermal noise. In order to suppress the thermal noise cryogenic cooling is required and cavities are used to increase the coupling of the incident electromagnetic radiation to the low energy transitions being exploited, but as discussed above this reduces the bandwidth available for the conversion frequencies and restricts the operation to a single spatial mode. Furthermore, existing converters based on opto-mechanical transduction require micro-fabricated components.

The one or more first sources of electromagnetic radiation may comprise any suitable and desired number of sources of electromagnetic radiation that are arranged to be incident upon the atomic assembly in order to excite atomic valence electrons in the atomic ensemble from the ground state to the first Rydberg state. Furthermore the one or more first sources of electromagnetic radiation may be arranged to be incident upon the atomic assembly in order to excite atomic valence electrons in the atomic ensemble from the ground state to the first Rydberg state using atomic transitions via any number of intermediate atomic states. Preferably the one or more first sources are arranged to excite atomic valence electrons via three or fewer intermediate atomic states, e.g. two or fewer, e.g. (and preferably) via a single intermediate atomic state. It is also envisaged that any individual source of electromagnetic radiation may be arranged to be used to excite atomic valence electrons between a plurality of different atomic states (i.e. preferably having transitions of similar frequencies).

Thus in a preferred embodiment the one or more first sources of electromagnetic radiation are arranged to excite atomic valence electrons in the atomic ensemble from the ground state to the first Rydberg state via an, e.g. single, intermediate excited state, preferably such that the two atomic transitions (from the ground state to the intermediate excited state and then to the first Rydberg state) each have a frequency (selected from a set of possible atomic transition frequencies for the atomic valence electrons in the atomic ensemble) between 193 THz and 800 THz, i.e. the transitions are preferably both optical or near-infrared transitions.

Operating the electromagnetic frequency converter in this way, i.e. to excite the atomic valence electrons using the one or more first sources of electromagnetic radiation from the ground state to the first Rydberg state via an (e.g. single) intermediate excited state (i.e. which is higher than the ground state and lower than the first Rydberg state) helps to reduce the time taken to populate the first Rydberg state, owing to the generally high strength of the atomic transition between the ground state and the intermediate excited state (thus preferably the intermediate state used (and thus also the frequencies of the one or more first sources) is preferably chosen to have a relatively strong transition to the ground state). Furthermore, using this excitation route to the first Rydberg state via the intermediate excited state helps to create a coherence relatively quickly between the ground state and the first Rydberg state owing to the relatively short lifetime of the intermediate excited state (particularly compared to the relatively long lifetime of the first Rydberg state). Finally, the relatively high strength of the atomic transition between the ground state and the intermediate excited state helps to allow a lower power source to be used to excite the atomic valence electrons from the ground state to the intermediate excited state.

Thus preferably the one or more first sources of electromagnetic radiation comprise:

one or more first sources (but preferably a (single) first source) of electromagnetic radiation each having a frequency selected from a set of possible atomic transition frequencies for the atomic valence electrons in the atomic ensemble, wherein the sum of the frequencies of the one or more first sources (but preferably the frequency of the (single) first source) is between 193 THz and 800 THz, wherein the electromagnetic radiation from the one or more first sources is arranged to be incident upon the atomic ensemble to excite atomic valence electrons in the atomic ensemble from a ground state to an intermediate excited state; and one or more third sources (but preferably a (single) third source) of electromagnetic radiation each having a frequency selected from a set of possible atomic transition frequencies for the atomic valence electrons in the atomic ensemble, wherein the sum of the frequencies of the one or more third sources (but preferably the frequency of the (single) third source) is between 193 THz and 800 THz, wherein the electromagnetic radiation from the one or more third sources is arranged to be incident upon the atomic ensemble to excite atomic valence electrons in the atomic ensemble from the intermediate excited state to the first Rydberg state.

Thus, in this embodiment, two or more, e.g. optical or near-infrared, atomic transitions are used to populate the first Rydberg state via the intermediate excited state (and preferably via no other intermediate states).

Similar to as described above for the one or more first sources of electromagnetic radiation, the one or more second sources of electromagnetic radiation may comprise any suitable and desired number of sources of electromagnetic radiation that are arranged to be incident upon the atomic assembly in order to excite atomic valence electrons in the atomic ensemble from the excited state to the second Rydberg state. Furthermore the one or more second sources of electromagnetic radiation may be arranged to be incident upon the atomic assembly in order to excite atomic valence electrons in the atomic ensemble from the excited state to the second Rydberg state using atomic transitions via any number of intermediate atomic states. Preferably the one or more second sources are arranged to excite atomic valence electrons via three or fewer intermediate atomic states, e.g. two or fewer, e.g. (and preferably) via a single intermediate atomic state. Preferably the (e.g. single) intermediate state is a (third) Rydberg state.

It is also envisaged that any individual source of electromagnetic radiation may be arranged to be used to excite atomic valence electrons between a plurality of different atomic states (i.e. preferably having transitions of similar frequencies). However, because the preferred intermediate atomic state is a (the third) Rydberg state, and thus much closer to the second (higher) Rydberg state than it is to the excited state, preferably one or more second sources of electromagnetic radiation comprise a plurality of (different) sources of electromagnetic radiation, as will be explained.

Thus, in a preferred embodiment the one or more second sources of electromagnetic radiation are arranged to excite atomic valence electrons in the atomic ensemble from the excited state to the second Rydberg state via an, e.g. single, intermediate (the third) Rydberg state, preferably such that the atomic transition from the excited state to the third Rydberg state has a frequency (selected from a set of possible atomic transition frequencies for the atomic valence electrons in the atomic ensemble) between 300 THz and 750 THz, i.e. this transition is preferably an optical or near-infrared transition, and such that the atomic transition from the third Rydberg state to the (higher) second Rydberg state has a frequency (selected from a set of possible atomic transition frequencies for the atomic valence electrons in the atomic ensemble) between 300 MHz and 3 THz, i.e. this transition is preferably a microwave or terahertz frequency transition.

Operating the electromagnetic frequency converter in this way, i.e. to excite the atomic valence electrons using the one or more second sources of electromagnetic radiation from the excited state to the second Rydberg state via an (e.g. single) intermediate (the third) Rydberg state (i.e. which is higher than the excited state and lower or higher than the second Rydberg state), helps to provide an atomic level scheme, particularly if the intermediate excited state is also employed, that contains an even number of transitions, which, as will be described below, thus allows favourable, i.e. allowed, dipole transitions to be used.

Thus preferably the one or more second sources of electromagnetic radiation comprise:

one or more second sources (but preferably a (single) second source) of electromagnetic radiation each having a frequency selected from a set of possible atomic transition frequencies for the atomic valence electrons in the atomic ensemble, wherein the sum of the frequencies of the one or more second sources (but preferably the frequency of the (single) second source) is between 300 THz and 750 THz, wherein the electromagnetic radiation from the one or more second sources is arranged to be incident upon the atomic ensemble to excite atomic valence electrons in the atomic ensemble from an excited state to a third Rydberg state; and one or more fourth sources (but preferably a (single) fourth source) of electromagnetic radiation each having a frequency selected from a set of possible atomic transition frequencies for the atomic valence electrons in the atomic ensemble, wherein the sum of the frequencies of the one or more fourth sources (but preferably the frequency of the (single) fourth source) is between 300 MHz and 3 THz, wherein the electromagnetic radiation from the one or more fourth sources is arranged to be incident upon the atomic ensemble to excite atomic valence electrons in the atomic ensemble from the third Rydberg state to the second Rydberg state.

Thus, in this embodiment, two or more, e.g. an optical or near-infrared and a microwave or terahertz frequency, atomic transitions are used to populate the second Rydberg state via the intermediate (third) Rydberg state (and preferably via no other intermediate states).

The atomic ensemble may comprise any suitable and desired atoms. In a preferred embodiment the atomic ensemble comprises alkali metal atoms (group 1 elements) or alkali earth metal atoms (group 2 elements), e.g. strontium. Alkali metal atoms are suited for use in the converter of the present invention because they have only a single valence electron, that is orbiting a positively charged core, and which can be excited to the Rydberg states, with the spectrum of valence electrons in such alkali metal atoms being well understood and suitable for the converter of the present invention. Preferably the atomic ensemble comprises rubidium atoms, caesium atoms or sodium atoms.

Preferably the atomic ensemble contains only a single type of atoms, e.g. rubidium atoms, caesium atoms or sodium atoms.

In a preferred embodiment the electromagnetic frequency converter comprises a vapour cell within which the atomic ensemble is held. Preferably the vapour cell comprises an input window transparent to the electromagnetic radiation from one or more (and preferably all) of: the one or more first sources, the one or more second sources, the first input and (when provided) the one or more third sources, e.g. transparent to frequencies between 193 THz and 1500 THz. Thus one or more (and preferably all) of the one or more first sources, the one or more second sources, the one or more third sources and the first input are arranged to direct their respective electromagnetic radiation therefrom through the input window so to be incident upon the atomic ensemble.

Preferably the vapour cell comprises an output window transparent to the electromagnetic radiation from the first output, e.g. transparent to frequencies between 193 THz and 800 THz. Thus preferably the first output is arranged to receive the electromagnetic radiation output from the atomic ensemble through the output window. Preferably the output window for the first output is opposite (e.g. lies in a plane substantially parallel to) the input window for one or more of: the one or more first sources, the one or more second sources, the one or more third sources and the first input.

The vapour cell may comprise a further input window transparent to the electromagnetic radiation from one or more (and preferably both) of: the second input and (when provided) the one or more fourth sources (e.g. transparent to frequencies between 300 MHz and 3 THz), with one or more (and preferably both) of: the one or more fourth sources and the second input being arranged to direct their respective electromagnetic radiation therefrom through the further input window so to be incident upon the atomic ensemble. However preferably one or more (and preferably both) of: the one or more fourth sources and the second input are arranged to direct their respective electromagnetic radiation therefrom through the input window for (the one or more, and preferably all of) the one or more first sources, the one or more second sources, the one or more third and the first input so to be incident upon the atomic ensemble. Therefore preferably the vapour cell comprises an input window transparent to the electromagnetic radiation from one or more (and preferably all) of: the one or more first sources, the one or more second sources, the one or more third sources, the one or more fourth sources, the first input and the second input, e.g. transparent to frequencies between 300 MHz and 3 THz, and between 193 THz and 1500 THz, e.g. between 300 MHz and 1500 THz.

The vapour cell may also comprise a further output window, e.g. being opposite and lying in a plane substantially parallel to the further input window, transparent to the electromagnetic radiation from the second output, e.g. transparent to frequencies between 300 MHz and 3 THz, with the second output being arranged to receive the electromagnetic radiation from the atomic ensemble through the further output window. However preferably the second output is arranged to receive its electromagnetic radiation from the atomic ensemble through the output window for the first input. Therefore preferably the vapour cell comprises an output window transparent to the electromagnetic radiation from one or more (preferably both) of: the first output and the second output, e.g. transparent to frequencies between 193 THz and 800 THz, and between 300 MHz and 3 THz, e.g. between 300 MHz and 800 THz.

Once the particular frequencies of the one or more first sources, the one or more second sources, and (when provided) the one or more third sources and the one or more fourth sources, and of the input electromagnetic radiation have been chosen, as will be discussed below, e.g. so that the electromagnetic frequency converter can convert between two specific frequencies, the input and/or output windows may be chosen such that they are transparent to these particular frequencies. Thus it may not be necessary for the input and/or output windows to be transparent to all possible frequencies.

As has been discussed, the electromagnetic frequency converter of the present invention does not need a cavity to operate. Therefore the incident electromagnetic radiation does not need to be input at a precise (e.g. single) location into the atomic ensemble, such that it is aligned accurately with the cavity. Thus preferably the electromagnetic frequency converter is arranged to be spatially multi-mode, meaning that the input radiation (from the first and/or second input) can be input into the atomic ensemble at a plurality of different positions, from where it will be converted. This may enable a microwave or terahertz frequency image (e.g. spatially extended over two dimensions) to be converted into an optical or near-infrared image.

Furthermore, this means that within the bandwidth of the electromagnetic frequency converter, the converter may be able to allow the input radiation signal (from the first and/or second input) to take any suitable or desired shape. This therefore allows temporally multiplexed signals to be input into the converter for conversion. In one embodiment, the bandwidth of input pulses that are to be converted is less than each of the detunings on the excited state of the atomic valence electrons in the atomic ensemble, the lower (third) Rydberg state and the higher (second) Rydberg state (and preferably the power of the one or more second sources and one or more fourth sources is arranged to enable this). For example, preferably the electromagnetic frequency converter is arranged to provide a bandwidth for the input microwave or terahertz radiation of greater than 100 MHz, e.g. greater than 1 GHz.

Preferably the electromagnetic frequency converter comprises a heater in good thermal communication with the vapour cell and arranged to heat the atomic ensemble (e.g. the vapour cell may comprise an integral heater). Heating the atomic ensemble helps to vaporise the atoms of the atomic ensemble such that they can absorb the incident radiation and emit converted radiation. If the atomic ensemble is heated, Doppler broadening of the transitions of the atomic ensemble may have to be overcome, e.g. minimised. The Doppler broadening of the transitions may be minimised in any suitable and desired way, e.g. using cold atoms (e.g. laser cooled) or the geometry of the electromagnetic frequency converter may be arranged to overcome the effects of the Doppler broadening. Preferably the Doppler width of the transitions is less than the detunings of the transitions, e.g. for the excited state of the atomic valence electrons in the atomic ensemble, the lower (third) Rydberg states and the higher (second) Rydberg states.

In another embodiment the electromagnetic frequency converter comprises a cryostat, wherein the atomic ensemble is contained within the cryostat. This helps to reduce the blackbody radiation which produces thermal noise in the microwave or terahertz frequency range and thus in the microwave or terahertz input and/or output.

The one or more first sources, the one or more second sources and (when provided) the one or more third sources of electromagnetic radiation (e.g. the optical or near-infrared radiation sources) may be provided in any suitable and desired way. In a preferred embodiment one or more (and preferably all) of the one or more first, one or more second and one or more third sources of electromagnetic radiation comprise a laser. Thus, in a particularly preferred embodiment, the laser(s) are arranged to direct their respective electromagnetic radiation through the input window (transparent to these sources) of the vapour cell to be incident upon the atomic ensemble within the vapour cell.

The one or more fourth sources of electromagnetic radiation (when provided, e.g. the microwave or terahertz radiation sources) may be provided in any suitable and desired way. In a preferred embodiment the one or more fourth sources comprises a microwave or terahertz radiation generator and a waveguide arranged to couple the microwave or terahertz radiation generated by the microwave or terahertz radiation generator to the atomic ensemble so that the microwave or terahertz radiation is incident upon the atomic ensemble. Thus, in a particularly preferred embodiment, a waveguide is arranged to direct the electromagnetic radiation from the microwave or terahertz radiation generator through the input window (transparent to the one or more fourth sources) of the vapour cell to be incident upon the atomic ensemble within the vapour cell.

In a preferred embodiment one or more (and preferably all) of (when provided): the one or more first sources, the one or more second sources, the one or more third sources, the one or more fourth sources, the first input and the second input are arranged to direct their respective electromagnetic radiation into the atomic ensemble in parallel directions, e.g. preferably collinearly. This maximises the overlap volume in the atomic ensemble that is illuminated by the various sources and inputs (particularly the optical and near-infrared sources and inputs owing to their shorter wavelength), and thus maximises the volume (and thus the number of atoms therein) that is available to perform frequency conversion, thereby maximising the efficiency of the converter.

When provided, the first input for electromagnetic radiation (i.e. the optical or near-infrared input) may be coupled to the atomic ensemble, such that the electromagnetic radiation is arranged to be incident upon the atomic ensemble from the first input, in any suitable and desired way. For example, the first input may comprise one or more of an optical fibre for carrying the electromagnetic radiation and one or more lenses and/or mirrors for focussing the electromagnetic radiation onto the atomic ensemble. Thus, in a particularly preferred embodiment, the first input is arranged to direct the input electromagnetic radiation through the input window (transparent to the frequency of the electromagnetic radiation from the first input) of the vapour cell, e.g. the same input window as used for at least the one or more first, one or more second, one or more third and/or one or more fourth sources of electromagnetic radiation, to be incident upon the atomic ensemble within the vapour cell.

When provided, the first output for electromagnetic radiation (i.e. the optical or near-infrared input) may be coupled to the atomic ensemble, such that the electromagnetic radiation is arranged to be received from the atomic ensemble at the first output, in any suitable and desired way. For example, the first output may comprise one or more of an optical fibre for carrying the electromagnetic radiation and one or more lenses and/or mirrors for collecting the electromagnetic radiation output from the atomic ensemble, e.g. for directing the output electromagnetic radiation into an optical fibre. Thus, in a particularly preferred embodiment the first output is coupled to the output window (transparent to the frequency of the electromagnetic radiation of the first output) of the vapour cell, wherein the first output for electromagnetic radiation is arranged to receive the electromagnetic radiation from the atomic ensemble through the output window.

When provided, the second input for electromagnetic radiation (i.e. the microwave or terahertz input) may be coupled to the atomic ensemble, such that the electromagnetic radiation is incident upon the atomic ensemble from the second input in any suitable and desired way. In a preferred embodiment, the second input comprises a waveguide (e.g. preferably the same waveguide as used for the one or more fourth sources of electromagnetic radiation, when provided) arranged to couple the microwave or terahertz radiation to the atomic ensemble so that the microwave or terahertz radiation is incident upon the atomic ensemble. Thus, in a particularly preferred embodiment, the waveguide is arranged to direct the electromagnetic radiation from the source of the microwave or terahertz radiation to be input through the input window (transparent to the frequency of the electromagnetic radiation from the second input) of the vapour cell to be incident upon the atomic ensemble within the vapour cell.

When provided, the second output for electromagnetic radiation (i.e. the microwave or terahertz output) may be coupled to the atomic ensemble, such that the electromagnetic radiation is arranged to be received from the atomic ensemble at the second output, in any suitable and desired way. In a preferred embodiment, the second output comprises a waveguide arranged to collect the microwave or terahertz radiation output from the atomic ensemble. Thus, in a particularly preferred embodiment, the waveguide is coupled to the output window (transparent to the frequency of the electromagnetic radiation of the second output) of the vapour cell, wherein the waveguide is arranged to collect the microwave or terahertz radiation output from the atomic ensemble through the output window.

The atomic transitions of the atomic valence electrons in the atomic ensemble that are used to couple to the various sources and inputs of electromagnetic radiation to perform the electromagnetic frequency conversion, may be any suitable and desired atomic transitions. In a preferred embodiment one or more (but preferably all) of the atomic transitions of the atomic valence electrons are electric dipole transitions. Electron dipole transitions have a stronger coupling to electromagnetic radiation than magnetic dipole transitions, e.g. as are used in Λ-type atomic ensembles, and thus make the electromagnetic frequency converter of the present invention more efficient (and, again, helps it to avoid having to use a cavity).

In one embodiment one or more (but preferably all) of the atomic transitions of the atomic valence electrons are from an electron subshell having an orbital angular momentum quantum number of 1 to an electron subshell having an orbital angular momentum quantum number of 0, i.e. P to S transitions, which are a special case of dipole-allowed transitions. These are particularly favoured electric dipole transitions (owing to the selection rules) and thus have a stronger coupling to electromagnetic radiation than transitions between electron subshells with different orbital angular momentum quantum numbers.

The difference in the principal quantum number of the excited state of the valence electrons in the atomic ensemble that is reached from the ground state by excitation by the first input and the principal quantum number of the ground state is preferably less than or equal to 4, e.g. 0, 1, 2 or 3 (most preferably the excited state and the ground state have the same principal quantum number). Alternatively stated, preferably the transition between the excited state and the ground state is an optical or near-infrared transition, i.e. having a transition frequency between 193 THz and 800 THz. In a preferred embodiment the frequency of the first input, and thus also the frequency of the transition between the ground state and the excited state, is between 375 THz and 500 THz.

Similarly, when the intermediate excited state is used, the principal quantum number of the intermediate excited state of the valence electrons in the atomic ensemble that is reached from the ground state by excitation by the first source and the principal quantum number of the ground state is preferably less than or equal to 4, e.g. 0, 1, 2 or 3 (most preferably the intermediate excited state and the ground state have the same principal quantum number). Alternatively stated, preferably the transition between the intermediate excited state and the ground state is an optical or near-infrared transition, i.e. a transition having a frequency between 193 THz and 800 THz. In a preferred embodiment the sum of the frequencies of the one or more first sources (when exciting atomic valence electrons between the ground state and the intermediate excited state) is between 375 THz and 500 THz, e.g. preferably the frequency of the (single) first source for this atomic transition is between 375 THz and 500 THz.

In one embodiment the intermediate excited state (when provided) of the valence electrons in the atomic ensemble that is reached by excitation by the one or more first sources and the excited state of the valence electrons in the atomic ensemble that is reached by excitation by the first input have the same principal quantum number (and preferably also the same orbital angular momentum quantum number) but comprise a different hyperfine state, e.g. preferably the intermediate excited state and the excited state are different atomic states.

In one embodiment the transitions between the ground state and the excited state (and when provided between the ground state and the intermediate excited state) of the valence electrons in the atomic ensemble (that couple to the incident electromagnetic radiation from the first input and the one or more first sources, when provided, respectively) are (at least one of) the D-lines transitions. Thus, in a particularly preferred embodiment, these transitions are the 5S to 5P transitions in rubidium, e.g. the $5S_{1/2}$ to $5P_{3/2}$ and/or $5S_{1/2}$ to $5P_{1/2}$ transitions, and/or the 6S to 6P transitions in caesium, e.g. the $6S_{1/2}$ to $6P_{3/2}$ and/or $6S_{1/2}$ to $6P_{1/2}$ transitions, and/or the 3S to 3P transitions in sodium, e.g. the $3S_{1/2}$ to $3P_{3/2}$ and/or $3S_{1/2}$ to $3P_{1/2}$ transitions.

In one embodiment the first, second and (when used) third Rydberg states (where the second Rydberg state is higher than the first Rydberg state), involved in the transitions between the ground state (or the intermediate excited state when provided) and the first Rydberg state, between the excited state and the second Rydberg state, and between the intermediate third Rydberg state and the second Rydberg state of the valence electrons in the atomic ensemble (that couple to the incident electromagnetic radiation from the one or more first, one or more third (when provided), one or more second and one or more fourth (when provided) sources respectively), have a principal quantum number between 20 and 80, e.g. between 30 and 70, e.g. between 40 and 60.

Preferably each of the first, second and (when provided) third Rydberg states are within 5% of the ionisation potential for the atomic valence electrons in the atomic ensemble. Preferably the difference in the principal quantum number of the second Rydberg state of the valence electrons in the atomic ensemble that is reached from the first and/or (when provided) intermediate third Rydberg states by excitation by the second input and (when provided) the one or more fourth sources respectively, and the principal quantum number of the first and/or third Rydberg states is preferably less than or equal to 60, e.g. less than 30, e.g. less than 10, e.g. less than 5 (in one embodiment the first, second and third Rydberg states all have the same principal quantum number).

Alternatively stated, preferably the atomic transition between the first and second Rydberg states (and also, when provided, the atomic transition between the third and second Rydberg states) is a microwave or terahertz transition, i.e. having a frequency between 300 MHz and 3 THz. In a preferred embodiment the frequency of the second input, and thus also the frequency of the atomic transition between the first and second Rydberg states, is between 1 GHz and 1.5 THz, e.g. between 2 GHz and 1 THz. In a preferred embodiment the sum of the frequencies of the one or more fourth sources (when provided, and exciting atomic valence electrons between the third Rydberg state and the second Rydberg state) is between 1 GHz and 1.5 THz, e.g. between 2 GHz and 1 THz, e.g. preferably the frequency of the (single) fourth source for this atomic transition is between 1 GHz and 1.5 THz, e.g. between 2 GHz and 1 THz.

In one embodiment the first Rydberg state and the second Rydberg state have the same principal quantum number but comprise different orbital angular momentum and/or azimuthal quantum numbers. In another embodiment the second Rydberg state and the third Rydberg state have the same principal quantum number but comprise different orbital angular momentum and/or azimuthal quantum numbers. In a further embodiment the first Rydberg state and the third Rydberg state have the same principal quantum number and the same orbital angular momentum quantum number but comprise different azimuthal quantum numbers.

As will be appreciated, the manifold of closely separated Rydberg states of the atomic ensemble provides a large number of different transitions between the first and third Rydberg states and the second Rydberg state that may be exploited for use in the electromagnetic frequency converter of the present invention, e.g. each of the first, second and third Rydberg states may be chosen from one of a plurality of Rydberg states in this manifold. The large number of different transitions available therefore provides a large number of different microwave or terahertz frequencies that may be used, either for conversion from or to. Thus, while the frequencies of the electromagnetic radiation arranged to be incident upon the atomic ensemble from the one or more first, one or more second, and (when provided) one or more third and one or more fourth sources may be chosen to be any suitable and desired frequencies, preferably the frequencies of the electromagnetic radiation arranged to be incident upon the atomic ensemble from the one or more first, one or more second, and (when provided) one or more third and one or more fourth sources is selected to excite the atomic valence electrons of the atomic ensemble into the first, second and third Rydberg states that have transitions therebetween that match (approximately) the microwave or terahertz radiation frequency to be input, and/or the desired microwave or terahertz radiation frequency that will be output.

As will be appreciated, when provided, the sum of the frequencies of the electromagnetic radiation from the one or more third sources and the frequency of the electromagnetic radiation from the one or more second source that are incident upon the atomic ensemble are preferably close to each other (owing to them both linking excited states (the excited state and the intermediate excited state, which are preferably close in energy to each other) and the (lower) first and third Rydberg states (which are also preferably close to each other)). Thus, in one embodiment, when the one or more third sources is a single third source of electromagnetic radiation and when the one or more fourth sources is a single fourth source of electromagnetic radiation, the electromagnetic frequency converter comprises a frequency shifter arranged to receive a portion (e.g. approximately half) of the electromagnetic radiation from a common source (e.g. a laser) and to output electromagnetic radiation having a frequency shifted relative to the frequency of the common to form the third source and the remainder of the portion of electromagnetic radiation from the common source forming the fourth source (or vice versa).

The frequency of the electromagnetic radiation arranged to be incident upon the atomic ensemble from the first input may be chosen to be any suitable and desired frequency. However, in contrast to the large number of available transitions in the manifold of closely separated Rydberg states of the atomic ensemble, the low-lying optical states are relatively sparse and thus there are many fewer transitions to choose between for use in the electromagnetic frequency converter. Thus, preferably the atoms of the atomic ensemble are chosen to possess a suitable atomic transition that matches (approximately) the optical or near-infrared radiation frequency to be input from the first input, and/or the desired optical or near-infrared radiation frequency that will be output from the atomic ensemble via the first output. Correspondingly, when the intermediate excited state is used, preferably the (summed) frequency of the one or more first sources of electromagnetic radiation is chosen to match (approximately) a suitable atomic transition of the atomic ensemble.

For example, if the atomic ensemble comprises sodium atoms, preferably the frequency of the electromagnetic radiation arranged to be incident upon the atomic ensemble from the first source (to excite atomic valence electrons to the intermediate excited state) or the first input (to excite atomic valence electrons to the excited state) is approximately 509 THz (corresponding to a wavelength of approximately 589 nm) or approximately 508 THz (a wavelength of approximately 590 nm) (corresponding to the 3S to 3P transitions). If the atomic ensemble comprises rubidium atoms, preferably the frequency of the electromagnetic radiation arranged to be incident upon the atomic ensemble from the first source (to excite atomic valence electrons to the intermediate excited state) or the first input (to excite atomic valence electrons to the excited state) is approximately 384 THz (a wavelength of approximately 780 nm) or approximately 377 THz (a wavelength of 795 nm) (corresponding to the 5S to 5P transitions). If the atomic ensemble comprises caesium atoms, preferably the frequency of the electromagnetic radiation arranged to be incident upon the atomic ensemble from the first source (to excite atomic valence electrons to the intermediate excited state) or the first input (to excite atomic valence electrons to the excited state) is approximately 352 THz (a wavelength of approximately 852 nm) or approximately 335 THz (a wavelength of approximately 895 nm) (corresponding to the 6S to 6P transitions).

The electromagnetic radiation from the (various sources of electromagnetic radiation may be arranged to be incident upon atomic ensemble such that any suitable and desired density of atoms in a Rydberg state is obtained, e.g. owing to the intensity of the radiation incident from each of the respective sources upon the atomic ensemble. Preferably the density of atoms in the atomic ensemble that are in a Rydberg state (when the electromagnetic radiation from the various sources are incident upon the atomic ensemble) is less than $10^{10}$ cm$^{-3}$ (compared to a density of all of the atoms in the atomic ensemble of preferably less than $10^{13}$ cm$^{-3}$). These relatively low densities help to minimise the interactions between atoms in the Rydberg states (the interaction length of atoms in the Rydberg states is of the order of millimetres to centimetres). Expressed alternatively, preferably the atoms in the atomic ensemble that are in a Rydberg state (when the electromagnetic radiation from the various sources is incident upon the atomic ensemble) form approximately 0.1% of the atoms in the atomic ensemble.

The density of the atoms (in total) in the atomic ensemble and the dimensions of the atomic ensemble may be chosen in any suitable and desired way. (As described above, preferably the density of all of the atoms in the atomic ensemble is less than $10^{13}$ cm$^{-3}$). However, as the electromagnetic frequency converter can be used either to convert optical or near-infrared frequency radiation from the first input into microwave or terahertz radiation, or to convert microwave or terahertz radiation from the second input into optical or near-infrared frequency radiation, it will thus be appreciated that if, for example, optical or near-infrared frequency radiation is input into the atomic ensemble from the first input to be converted into microwave or terahertz radiation, there is a finite probability that any microwave or terahertz radiation produced from the conversion will be converted back into optical or near-infrared frequency radiation (and vice versa), depending on the depth and density of the atomic ensemble. Therefore once the density of the atoms in the atomic ensemble and/or the dimensions of the atomic ensemble have been chosen, the intensity (i.e. the drive power) of the various sources of electromagnetic radiation that are arranged to be incident upon the atomic assembly are tuned, to tune the electromagnetic frequency converter to the desired amount of conversion.

As has been alluded to above, preferably the atomic states and transitions to be used in the atomic ensemble are chosen so that the frequencies of the various sources of electromagnetic radiation as well as the first or second input electromagnetic radiation have frequencies that are close to the frequencies of suitable respective transitions of the atomic valence electrons in the atomic ensemble, e.g. the frequencies are near-resonant for the transitions (this can be alternatively expressed that the difference between the frequency of the input electromagnetic radiation and the resonant frequency of the transition is much smaller than the resonant frequency of the transition itself). This near-resonant condition helps to ensure that other atomic states of the atomic ensemble may be disregarded.

However, the Applicant has appreciated that the fine tuning of the frequencies of the electromagnetic radiation from the various sources and the first or second input may help to improve the efficiency of the electromagnetic frequency converter. Thus, in a preferred embodiment the one or more first sources of electromagnetic radiation, e.g. the one or more first and the one or more third sources of electromagnetic radiation, have frequencies that are resonant with the one or more atomic transitions that are used to excite the atomic valence electrons from the ground state to the first Rydberg state, e.g. the one or more first sources comprise a source (preferably the (single) first source) that is resonant with the atomic transition into (preferably between the ground state and) the intermediate excited state and the one or more third sources comprise a source (preferably the (single) third source) that is resonant with the atomic transition into (preferably between the intermediate excited state and) the first Rydberg state.

Preferably the frequency difference between the frequency of each of the one or more first sources and frequency of the corresponding atomic transition(s) is small compared to the respective Rabi frequencies of each the one or more first sources, e.g. preferably the frequency difference between the frequency of the (single) first source and the frequency of the atomic transition between the ground state and the intermediate excited state is small compared to the Rabi frequency of the first source. Preferably the frequency difference between the frequency of each of the one or more third sources and frequency of the corresponding atomic transition(s) is small compared to the respective Rabi frequencies of each the one or more third sources, e.g. preferably the frequency difference between the frequency of the (single) third source and the frequency of the atomic transition between the intermediate excited state and the first Rydberg state is small compared to the Rabi frequency of the third source.

Also, in a preferred embodiment, one or more (and preferably all) of: the first input/output, the second input/output and the one or more second sources of electromagnetic radiation, e.g. the one or more second and the one or more fourth sources of electromagnetic radiation, have frequencies that are chosen such that one or more (and preferably all) of the atomic transitions used between the ground state and the excited state, between the excited state and the second or third Rydberg state, between the third Rydberg state and the second Rydberg state, and between the first Rydberg state and the second Rydberg state are detuned from resonance with the respective atomic states (but preferably detuned by no more than an amount such that the corresponding transitions may be addressed individually by the respective sources and/or inputs and outputs).

The detunings for these transitions enable a quantum interference effect where the atomic ensemble is nearly transparent for the input electromagnetic radiation while generating an atomic coherence on the output transition. In this way, the (first or second) input electromagnetic radiation may be coherently converted into the (second or first) output electromagnetic radiation. Thus preferably the atomic ensemble is nearly transparent for the (first or second) input electromagnetic radiation but generates an atomic coherence on the atomic transition corresponding to the (second or first) output electromagnetic radiation.

In one embodiment, the second input (of microwave or terahertz frequency radiation) is preferably detuned from resonance with the second Rydberg state, and preferably the difference in the frequency of the second input and the frequency of the atomic transition between the first and second Rydberg states of the valence electrons of the atomic ensemble is much less than the frequency of the transition between the first and second Rydberg states itself. In another embodiment, the first input (of optical or near-infrared frequency radiation) is preferably detuned from resonance with the excited state, and preferably the difference in the frequency of the first input and the frequency of the transition between the ground and excited state of the valence electrons of the atomic ensemble is much less than the frequency of the transition between the ground and excited state itself.

The frequencies of the electromagnetic radiation arranged to be incident upon the atomic ensemble from the one or more first, one or more second, and (when provided) the one or more third and one or more fourth sources may be chosen to be any suitable and desired frequencies such that the input electromagnetic radiation is converted into the output electromagnetic radiation. However, in the embodiment in which the electromagnetic frequency converter comprises a (single) first source, a (single) second source, a (single) third source and a (single) fourth source, preferably the frequencies and intensities of the electromagnetic radiation from the first, second, third and fourth sources satisfy the following conditions:

$$\Delta_5 = \frac{|\Omega_4|^2}{\Delta_4}; \quad \Delta_6 = \frac{|\Omega_2|^2}{\Delta_5}; \text{ and } |\Omega_3| \gg |\Omega_1|,$$

where $\Omega_1$ is the Rabi frequency of the electromagnetic radiation from the first source, $\Omega_2$ is the Rabi frequency of the electromagnetic radiation from the second source, $\Omega_3$ is the Rabi frequency of the electromagnetic radiation from the third source, $\Omega_4$ is the Rabi frequency of the electromagnetic radiation from the fourth source, $\Delta_4$-$\Delta_5$ is the detuning of the electromagnetic radiation from the fourth source from the atomic transition between the third Rydberg state and the second Rydberg state, and $\Delta_5$-$\Delta_6$ is the detuning of the electromagnetic radiation from the second source from the atomic transition between the third Rydberg state and the excited state. These conditions help to enable the efficient conversion of the input electromagnetic radiation into the output electromagnetic radiation, e.g. by enabling a quantum interference effect to occur where the atomic ensemble is nearly transparent to the incident electromagnetic radiation from the first and/or second inputs, while generating a coherence on the atomic transition used for the second and/or first outputs respectively.

The electromagnetic frequency converter of the present invention is suitable both for the conversion of electromagnetic radiation in both classical and non-classical quantum states. If the electromagnetic frequency converter is used for the conversion of quantum electromagnetic radiation, e.g. to convert microwave processing signals used in quantum computers into optical signals for transmission (or vice versa), preferably the electromagnetic frequency converter is arranged to convert the input electromagnetic radiation into the output electromagnetic radiation coherently, i.e. phase coherently. This coherent conversion of the electromagnetic radiation helps to preserve quantum states.

To help achieve coherent conversion of the input electromagnetic radiation to the output electromagnetic radiation, as well as the above discussed preferable conditions, e.g. the lifetimes of the Rydberg states having lifetimes that are much longer than the lifetimes of the excited and (when provided) intermediate excited state, preferably the various sources, inputs and outputs are arranged such that the sum of the frequencies on either side of the atomic transitions from the ground state to the second Rydberg state are approximately equal (and, e.g., thus sum to a closed loop), i.e. preferably the sum of the frequencies of the one or more first sources of electromagnetic radiation (e.g. the frequencies of the one or more first sources and one or more third sources) and the frequency of the second input or output is approximately equal to the sum of the frequencies of the one or more second sources of electromagnetic radiation (e.g. the frequencies of the one or more second sources and one or more fourth sources) and the frequency of the first output or input.

Also, preferably the various sources, inputs and outputs are arranged such that they are phase matched, i.e. preferably the sum of the wavevectors of the one or more first sources of electromagnetic radiation (e.g. the frequencies of the one or more first sources and one or more third sources), the one or more second sources of electromagnetic radiation (e.g. the frequencies of the one or more second sources and one or more fourth sources), the first input or output and the second output or input is approximately equal to zero. In addition, preferably the sum of the wavevectors of the one or more first sources of electromagnetic radiation (e.g. the wavevectors of the one or more first sources and one or more third sources) and the wavevectors of the second output or input is approximately equal to the sum of the wavevectors of the one or more second sources of electromagnetic radiation (e.g. the wavevectors of the one or more second sources and one or more fourth sources) and the wavevectors of the first input or output.

Embodiments of the invention will now be described, by way of example only, with reference to the accompanying drawings, in which.

A preferred embodiment of the electromagnetic frequency converter will now be described, which allows conversion of an optical or near-infrared frequency input into a microwave or terahertz frequency output, or vice versa. Such a converter has many uses, e.g. in the fields of telecommunications, opto-electronics and quantum computing.

Figure 1:
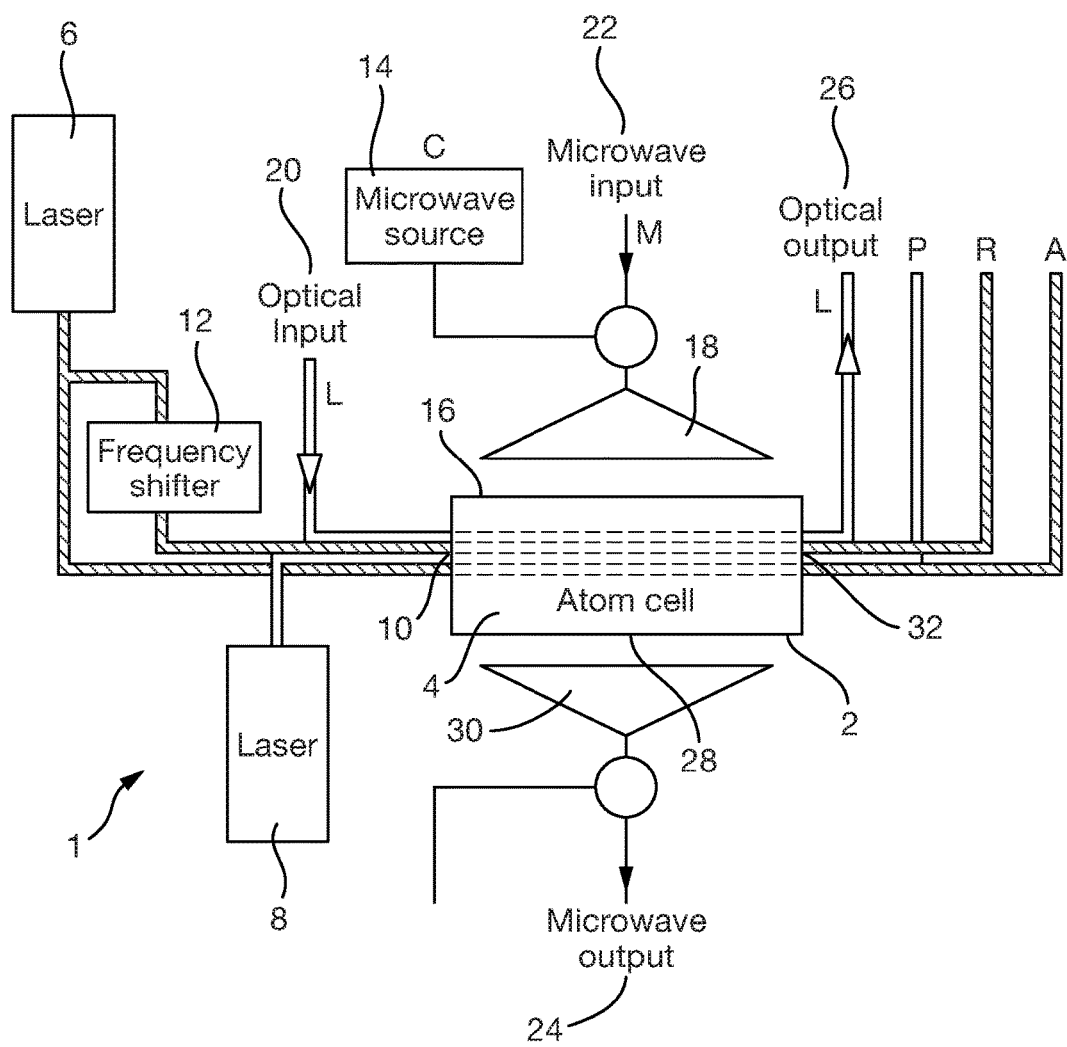
FIG. 1 is a schematic diagram showing an electromagnetic frequency converter according to an embodiment of the present invention.

FIG. 1 is a schematic diagram showing an electromagnetic frequency converter 1 according to an embodiment of the present invention. The electromagnetic frequency converter 1 includes a vapour cell 2 containing an atomic ensemble 4, e.g. of rubidium, caesium or sodium atoms. The vapour cell 2 includes a heater (not shown) to vaporise the atoms of the atomic ensemble 4. In one embodiment the vapour cell 2 is a cylinder having a diameter of approximately 1 cm and a length of approximately 2 cm.

The electromagnetic frequency converter 1 also includes first and second lasers 6, 8 that act as sources of optical or near-infrared radiation A, P to be incident upon the atomic ensemble 4 within the vapour cell 2. The vapour cell 2 has a window 10 at one end that is transparent to the frequencies of the optical or near-infrared radiation A, P from the lasers 6, 8, which are arranged to direct their optical or near-infrared radiation A, P into the vapour cell 2 through the window 10, so as to be incident upon the atomic ensemble 4.

Half of the optical or near-infrared radiation A from the first laser 6 is separated from the rest of the laser beam and directed through a frequency shifter 12 to shift the frequency of the optical or near-infrared radiation before the optical or near-infrared radiation with the shifted frequency R is directed through the window 10 of the vapour cell 2 so as to be incident upon the atomic ensemble 4.

The electromagnetic frequency converter 1 further includes a microwave or terahertz radiation generator 14 that acts as a source of microwave or terahertz radiation C to be incident upon the atomic ensemble 4 within the vapour cell 2. The vapour cell 2 has a window 16 at one side, lying perpendicular to the window 10 for the input optical or near-infrared radiation A, R, P, that is transparent to the frequencies of the microwave or terahertz radiation C from the microwave or terahertz radiation generator 14. A waveguide 18 is used to carry the microwave or terahertz radiation C from the microwave or terahertz radiation generator 14 and to direct the microwave or terahertz radiation C into the vapour cell 2 through the window 16, so as to be incident upon the atomic ensemble 4.

The electromagnetic frequency converter 1 further includes an optical or near-infrared radiation input 20 that is arranged to input optical or near-infrared radiation L into the vapour cell 2 through the window 10 transparent to optical or near-infrared radiation, so as to be incident upon the atomic ensemble 4. The electromagnetic frequency converter 1 also includes a microwave or terahertz radiation input 22 that is arranged to input microwave or terahertz radiation M into the vapour cell 2 through the window 16 transparent to microwave or terahertz radiation, so as to be incident upon the atomic ensemble 4.

The electromagnetic frequency converter 1 also includes a microwave or terahertz radiation output 24 and an optical or near-infrared radiation output 26. The microwave or terahertz radiation output 24 is arranged to receive microwave or terahertz radiation that is output from the atomic ensemble 4 in the vapour cell 2 via a window 28 and a waveguide 30. The output window 28 in the vapour cell 2 is transparent to the frequency(s) of the microwave or terahertz radiation that is output from the atomic ensemble 4 within the vapour cell 2, and is arranged on the opposite side of the vapour cell 2 from the input window 16 for microwave or terahertz radiation.

The optical or near-infrared radiation output 26 is arranged to receive optical or near-infrared radiation that is output from the atomic ensemble 4 in the vapour cell 2 via a window 32. The output window 32 in the vapour cell 2 is transparent to the frequency(s) of the optical or near-infrared radiation that is output from the atomic ensemble 4 within the vapour cell 2, and is arranged on the opposite side of the vapour cell 2 from the input window 10 for optical or near-infrared radiation.

Figure 2:
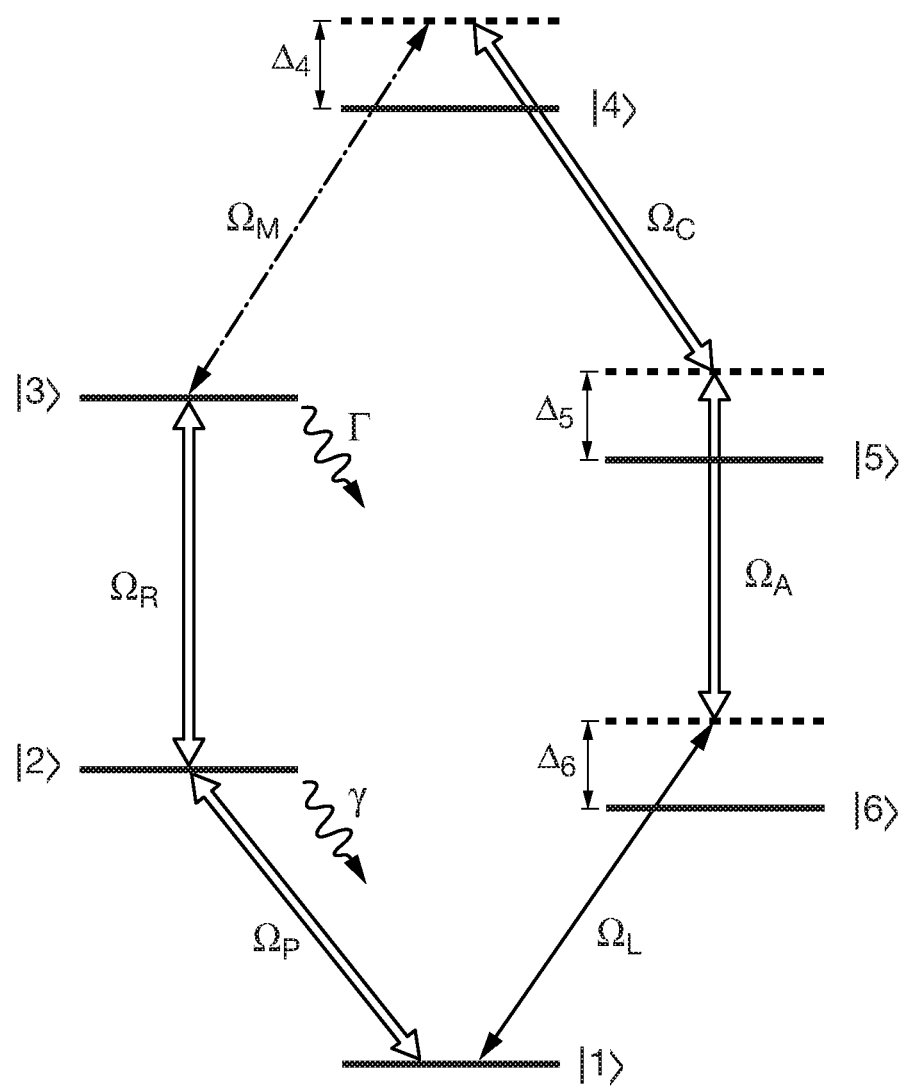
FIG. 2 shows an atomic level scheme used in an electromagnetic frequency converter according to an embodiment of the present invention.

The embodiment of the electromagnetic frequency converter 1 shown in FIG. 1 is able to operate in two main modes of operation: to convert microwave or terahertz radiation into optical or near-infrared radiation and vice versa. Both modes of operation will now be described with reference to FIGS. 1 and 2. FIG. 2 is an atomic level scheme used in the electromagnetic frequency converter 1.

In both modes of operation, the atomic ensemble 4 is prepared in the vapour cell 2 and the heater is energised to vaporise the atoms of the atomic ensemble 4. The first and second lasers 6, 8 are energised, with a portion, e.g. half, of the optical or near-infrared radiation from the first laser 6 being separated from the rest of the laser beam and directed through the frequency shifter 12 to shift the frequency of the optical or near-infrared radiation. The optical or near-infrared radiation A, R, P from the first and second lasers 6, 8, and the frequency shifter 12 are directed through the input window 10 of the vapour cell 2 so as to be incident upon the atomic ensemble 4.

The optical or near-infrared radiation P from the second laser 8 (having a Rabi frequency $\Omega_P$) excites atomic valence electrons in the atomic ensemble from their ground state $|1\rangle$ into an intermediate excited state $|2\rangle$ via an electric dipole transition. The frequency of the optical or near-infrared radiation P from the second laser 8 is chosen to be resonant with the atomic transition from the ground state $|1\rangle$ to the intermediate excited state $|2\rangle$.

The shifted optical or near-infrared radiation R from the first laser 6 (having a Rabi frequency $\Omega_R$) excites atomic valence electrons in the atomic ensemble from their intermediate excited state $|2\rangle$ into a highly excited first Rydberg state $|3\rangle$ via an electric dipole transition. The frequency of the shifted optical or near-infrared radiation R from the first laser 6 is chosen to be resonant with the atomic transition from the intermediate excited state $|2\rangle$ to the first Rydberg state $|3\rangle$.

Likewise, the optical or near-infrared radiation A from the first laser 6 (having a Rabi frequency $\Omega_A$) excites atomic valence electrons in the atomic ensemble from another excited state $|6\rangle$ to another highly excited third Rydberg state $|5\rangle$ via an electric dipole transition. The frequency of the optical or near-infrared radiation A from the first laser 6 is chosen to be detuned from the atomic transition from the excited state $|6\rangle$ to the third Rydberg state $|5\rangle$ by an amount $\Delta_5 - \Delta_6$.

The microwave or terahertz radiation generator 14 is also energised to produce microwave or terahertz radiation C that is directed along the waveguide 18 and through the input window 16 of the vapour cell 2 so as also to be incident upon the atomic ensemble 4. This microwave or terahertz radiation C (having a Rabi frequency $\Omega_C$) excites atomic valence electrons from the third Rydberg state $|5\rangle$ to a higher second Rydberg state $|4\rangle$ via an electric dipole transition. The frequency of the microwave or terahertz radiation C is chosen to be detuned from the atomic transition from the third Rydberg state $|5\rangle$ to the second Rydberg state $|4\rangle$ by an amount $\Delta_4 - \Delta_5$.

With the three sources of optical or near-infrared radiation A, R, P and the source of microwave or terahertz radiation C incident upon the atomic ensemble 4 in the vapour cell 2, the input electromagnetic radiation can then be input to the atomic ensemble 4 for conversion. The resonant optical or near-infrared radiation R, P (having Rabi frequencies $\Omega_R$ and $\Omega_P$ respectively) from the first and second lasers 6, 8 respectively create a coherence on the $|1\rangle \leftrightarrow |3\rangle$ transition through coherent population trapping.

If the electromagnetic frequency converter 1 is being used to convert microwave or terahertz radiation into optical or near-infrared radiation, the microwave or terahertz radiation M (having a Rabi frequency $\Omega_M$) is input from the microwave or terahertz input 22 and directed along the waveguide 18 and through the input window 16 of the vapour cell 2 so as to be incident upon the atomic ensemble 4. Upon incidence on the atomic ensemble 4, the microwave or terahertz radiation M couples to the electric dipole transition between the Rydberg states $|3\rangle$ and $|4\rangle$, with the frequency of the input microwave or terahertz radiation M being detuned from the transition $|3\rangle \leftrightarrow |4\rangle$ by an amount $\Delta_4$.

When the microwave or terahertz radiation M is input, this creates a coherence on the optical or near-infrared frequency transition $|6\rangle \leftrightarrow |1\rangle$, but not on the microwave or terahertz frequency transition $|4\rangle \leftrightarrow |3\rangle$ (which is suppressed through quantum interference). As a result, the input microwave or terahertz radiation M is converted into optical or near-infrared radiation (having a Rabi frequency $\Omega_L$). This optical or near-infrared radiation is then output from the atomic ensemble 4 through the output window 32 in the vapour cell 2 that is transparent to the frequency of the optical or near-infrared radiation, where it is received by the optical or near-infrared radiation output 26.

If the electromagnetic frequency converter 1 is being used to convert optical or near-infrared radiation into microwave or terahertz radiation, the optical or near-infrared radiation L (having a Rabi frequency $\Omega_L$) is input from the optical or near-infrared input 20 and directed through the input window 10 (that is transparent to radiation of such frequency) of the vapour cell 2 so as to be incident upon the atomic ensemble 4. Upon incidence on the atomic ensemble 4, the optical or near-infrared radiation L couples to the electric dipole transition between the ground and excited states |1> and |6>, with the frequency of the input optical or near-infrared radiation L being detuned from the transition |1>↔|6> by an amount $\Delta_6$.

When the optical or near-infrared radiation L is input, this creates a coherence on the microwave or terahertz frequency transition |4>↔|3>, but not on the optical or near-infrared frequency transition |6>↔|1> (which is suppressed through quantum interference). As a result, the input optical or near-infrared radiation L is converted into microwave or terahertz radiation (having a Rabi frequency $\Omega_M$). This microwave or terahertz radiation is then output from the atomic ensemble 4 through the output window 28 in the vapour cell 2 that is transparent to the frequency of the microwave or terahertz radiation, where it is received by the microwave or terahertz radiation output 24 via the output waveguide 30.

As has been described above, while the sources of optical or near-infrared radiation P, R have frequencies that are resonant with the respective atomic transitions, the input optical or near-infrared radiation L, or the input microwave or terahertz radiation M, as well as the source of optical or near-infrared radiation A and the source of optical or near-infrared radiation C are detuned from their respective atomic transitions.

In order for the conversion efficiency of the incident radiation to be maximised, preferably the following conditions between the Rabi frequencies and the detuning parameters are met:

$$\Delta_5 = \frac{|\Omega_C|^2}{\Delta_4}; \quad \Delta_6 = \frac{|\Omega_A|^2}{\Delta_5}; \text{ and } |\Omega_R| \gg |\Omega_P|,$$

where $\Omega_C$, $\Omega_A$, $\Omega_R$ and $\Omega_P$ are the Rabi frequencies of the respective sources of electromagnetic radiation C, A, R and P, $\Delta_4$ is the detuning of the frequency of the input microwave or terahertz radiation M from the transition |3>↔|4>, $\Delta_6$ is the detuning of the frequency of the input optical or near-infrared radiation L from the transition |1>↔|6>, $\Delta_4-\Delta_5$ is the detuning of the frequency of the microwave or terahertz radiation C from the atomic transition from the third Rydberg state |5> to the second Rydberg state |4> and $\Delta_5-\Delta_6$ is the detuning of the frequency of the optical or near-infrared radiation A from the atomic transition from the excited state |6> to the third Rydberg state |5>.

These detuning conditions enable a quantum interference effect where the atomic ensemble is nearly transparent for the input electromagnetic radiation while generating a coherence on the transition that produces the output electromagnetic radiation. If these conditions are strongly violated, the input electromagnetic radiation experiences dispersion or absorption in the atomic ensemble and may not be converted into the output field. The tolerance in the detunings in order to maximise the efficiency of the conversion is similar to the allowed bandwidth of the input electromagnetic radiation.

Figure 3:
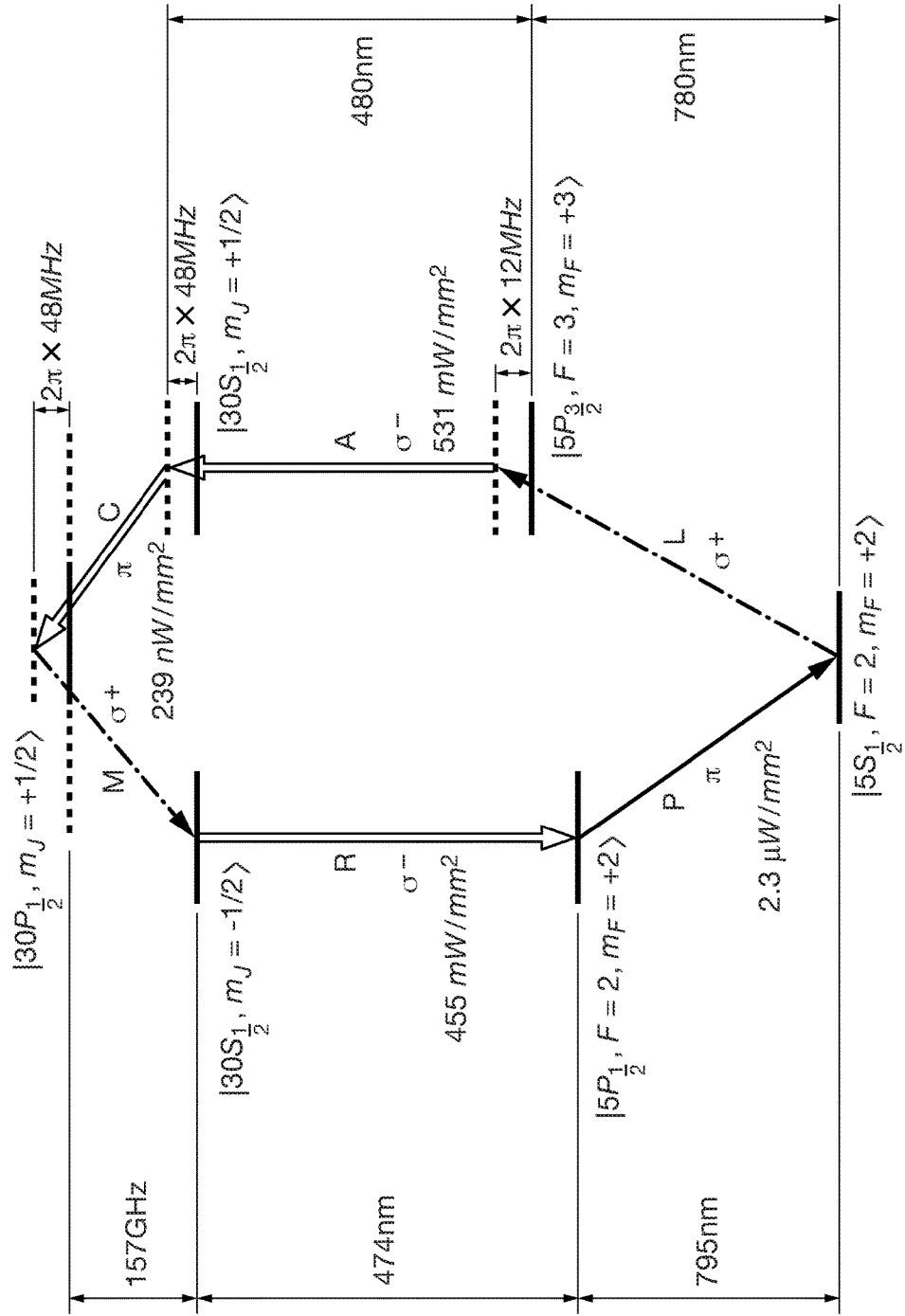
FIG. 3 shows an specific example of an atomic level scheme used in an electromagnetic frequency converter according to an embodiment of the present invention.

FIG. 3 shows an specific example of an atomic level scheme used in an electromagnetic frequency converter according to an embodiment of the present invention, when the vapour cell contains an atomic ensemble of rubidium atoms.

Operation of this embodiment, which may be arranged according to the setup shown in FIG. 1, will now be described. Similar to the embodiment described with reference to FIGS. 1 and 2, the embodiment shown in FIG. 3 is able to operate in two main modes of operation: to convert microwave radiation into near-infrared radiation and vice versa. Both modes of operation will now be described with reference to FIGS. 1 and 3.

In both modes of operation, the atomic ensemble 4 of rubidium atoms is prepared in the vapour cell 2 and the heater is energised to vaporise the rubidium atoms of the atomic ensemble 4. The first laser 6, having a frequency of approximately 625 THz, is energised and a portion of its output radiation (having an intensity of approximately 531 mW/mm$^2$) is separated from the rest of the laser beam and directed through the frequency shifter 12 to shift its frequency to approximately 632 THz. The remaining 625 THz radiation A (having an intensity of approximately 455 mW/mm$^2$) and the 632 THz radiation R from the first laser 6 are directed through the input window 10 of the vapour cell 2 so as to be incident upon the rubidium atomic ensemble 4.

The electromagnetic radiation P from the second laser 8, having a frequency of approximately 377 THz and an intensity of approximately 2.3 µW/mm$^2$, is also directed through the input window 10 of the vapour cell 2 so as to be incident upon the rubidium atomic ensemble 4.

The 377 THz radiation P from the second laser 8 excites atomic valence electrons in the atomic ensemble from their $5S_{1/2}$ ground state into an intermediate $5P_{1/2}$ excited state via an electric dipole transition. The 377 THz radiation P is resonant with the atomic transition from the $5S_{1/2}$ ground state to the intermediate $5P_{1/2}$ excited state.

The shifted 632 THz radiation R from the first laser 6 excites atomic valence electrons in the atomic ensemble from their intermediate $5P_{1/2}$ excited state into a highly excited $30S_{1/2}$ first Rydberg state via an electric dipole transition. The 632 THz radiation R is resonant with the atomic transition from the intermediate $5P_{1/2}$ excited state to the $m_J=-1/2$ Zeeman sublevel of the $30S_{1/2}$ first Rydberg state.

Likewise, the 625 THz radiation A from the first laser 6 excites atomic valence electrons in the atomic ensemble from a $5P_{3/2}$ excited state to the $m_J=+1/2$ Zeeman sublevel of the excited $30S_{1/2}$ third Rydberg state via an electric dipole transition. The 625 THz radiation A is detuned from the atomic transition from the $5P_{3/2}$ excited state to the $m_J=+1/2$ Zeeman sublevel of the excited $30S_{1/2}$ third Rydberg state by 36 MHz.

The microwave radiation generator 14 is also energised to produce microwave radiation C, having a frequency of approximately 157 GHz and an intensity of 239 nW/mm$^2$, that is directed along the waveguide 18 and through the input window 16 of the vapour cell 2 so as also to be incident upon the atomic ensemble 4. This 157 GHz radiation C excites atomic valence electrons from the $m_j=+1/2$ Zeeman sublevel of the excited $30S_{1/2}$ third Rydberg state to a higher $30P_{1/2}$ second Rydberg state via an electric dipole transition. The 157 GHz radiation C is detuned from the atomic transition from the $m_j=+1/2$ Zeeman sublevel of the excited $30S_{1/2}$ third Rydberg state to the $30P_{1/2}$ second Rydberg state by 48 MHz at each end of the transition.

With the 377 THz radiation P, the 632 THz radiation R, the 625 THz radiation A and the 157 GHz radiation C incident upon the rubidium atomic ensemble 4 in the vapour cell 2, the input electromagnetic radiation can then be input to the atomic ensemble 4 for conversion. The 377 THz radiation P and the 632 THz radiation R from the first and second lasers 6, 8 respectively create a coherence on the transition between the $5S_{1/2}$ ground state and the $m_j=1/2$ Zeeman sublevel of the $30S_{1/2}$ first Rydberg state through coherent population trapping.

If the electromagnetic frequency converter 1 is being used to convert microwave radiation into near-infrared radiation, the microwave radiation M (having a frequency of approximately 157 GHz) is input from the microwave input 22 and directed along the waveguide 18 and through the input window 16 of the vapour cell 2 so as to be incident upon the atomic ensemble 4. Upon incidence on the atomic ensemble 4, the microwave radiation M couples to the electric dipole transition between the $m_j=-1/2$ Zeeman sublevel of the $30S_{1/2}$ first Rydberg state and the $30P_{1/2}$ second Rydberg state (from which it is detuned by 48 MHz).

When the 157 GHz microwave radiation M is input, this creates a coherence on the near-infrared frequency transition between the $5P_{3/2}$ excited state and the $5S_{1/2}$ ground state, but not on the microwave frequency transition between the $m_j=-1/2$ Zeeman sublevel of the $30S_{1/2}$ first Rydberg state and the $30P_{1/2}$ second Rydberg state (which is suppressed through quantum interference). As a result, the input 157 GHz microwave radiation M is converted into near-infrared radiation (having a frequency of approximately 384 THz, which is detuned from the transition between the $5P_{3/2}$ excited state and the $5S_{1/2}$ ground state by 12 MHz). This 384 THz near-infrared radiation is then output from the atomic ensemble 4 through the output window 32 in the vapour cell 2 that is transparent to the 384 THz near-infrared radiation, where it is received by the near-infrared radiation output 26.

If the electromagnetic frequency converter 1 is being used to convert near-infrared radiation into microwave radiation, the 384 THz near-infrared radiation L is input from the optical input 20 and directed through the input window 10 (that is transparent to radiation of such frequency) of the vapour cell 2 so as to be incident upon the atomic ensemble 4. Upon incidence on the atomic ensemble 4, the 384 THz radiation L couples to the electric dipole transition between the $5P_{3/2}$ excited state and the $5S_{1/2}$ ground state, with the frequency of the 384 THz input radiation L being detuned from the transition by 12 MHz.

When the 384 THz radiation L is input, this creates a coherence on the microwave transition between the $m_j=-1/2$ Zeeman sublevel of the $30S_{1/2}$ first Rydberg state and the $30P_{1/2}$ second Rydberg state, but not on the 384 THz optical transition between the $5P_{3/2}$ excited state and the $5S_{1/2}$ ground state (which is suppressed through quantum interference). As a result, the input 384 THz radiation L is converted into microwave radiation (having a frequency of approximately 157 GHz, which is detuned from the transition between the $m_j=-1/2$ Zeeman sublevel of the $30S_{1/2}$ first Rydberg state and the $30P_{1/2}$ second Rydberg state by 48 MHz). This 157 GHz microwave radiation is then output from the atomic ensemble 4 through the output window 28 in the vapour cell 2 that is transparent to the frequency of the 157 GHz microwave radiation, where it is received by the microwave radiation output 24 via the output waveguide 30.

Figure 4A:
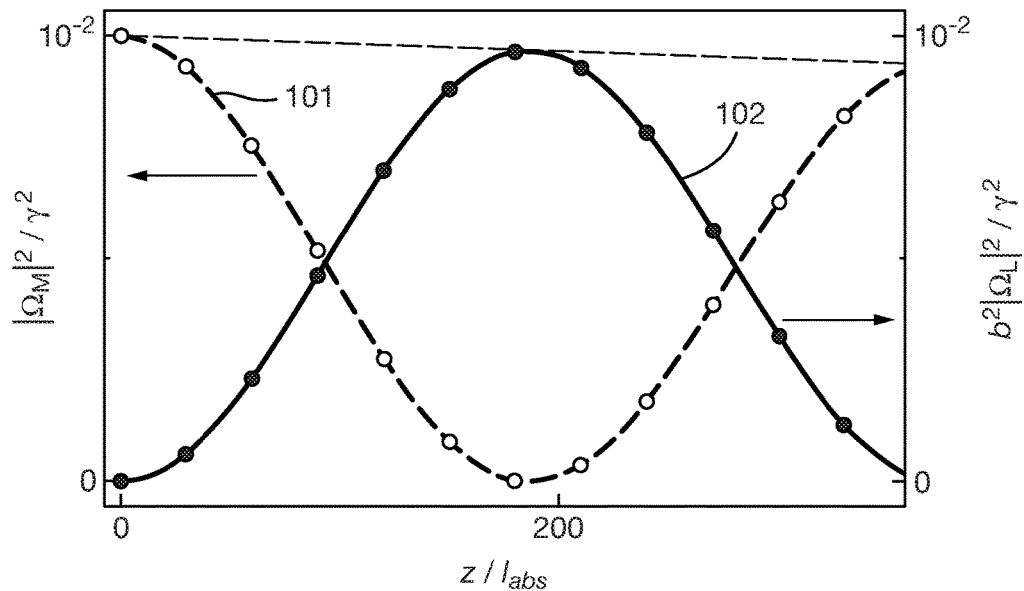
FIGS. 4a and 4b show simulation plots of the intensities of input electromagnetic radiation frequencies into the embodiment of the electromagnetic frequency converter operated according to the atomic level scheme shown in FIG. 3.
Figure 4B:
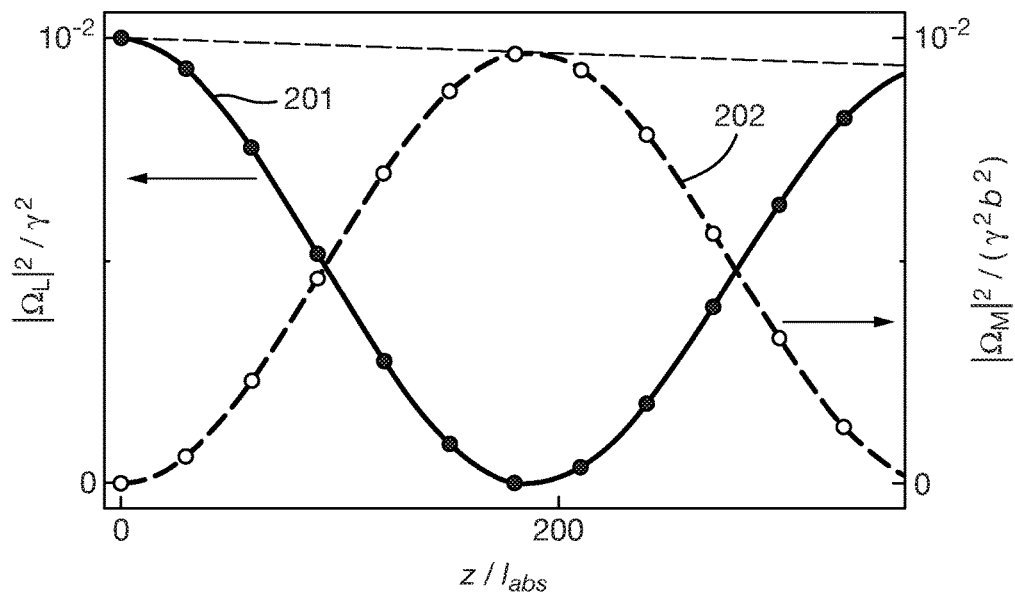

FIGS. 4 and 4b show simulation plots of the intensities of input electromagnetic radiation frequencies into the embodiment of the electromagnetic frequency converter operated according to the atomic level scheme shown in FIG. 3. The efficiency of the electromagnetic wavelength converter according to the scheme shown in FIG. 3 will now be described with reference to the plots shown in FIGS. 4a and 4b. The dots in the plots indicate the results from a numerical integration of the Maxwell-Bloch equations.

The parameters used in the simulations were:

$\Gamma/\gamma=1/624.84$, where $\Gamma$ is the lifetime of the $30S_{1/2}$ first Rydberg state, and $\gamma$ is the lifetime of the intermediate $5P_{1/2}$ excited state;

$\Omega_A=4\gamma$, where $\Omega_A$ is the Rabi frequency of the 625 THz radiation A from the first laser 6;

$\Omega_C=8\gamma$, where $\Omega_C$ is the Rabi frequency of the 157 GHz radiation C from the microwave generator 14;

$\Omega_R=3\gamma$, where $\Omega_R$ is the Rabi frequency of the shifted 632 THz radiation R from the first laser 6;

$\Omega_P=0.15\gamma$, where $\Omega_P$ is the Rabi frequency of the 377 THz radiation P from the second laser 8;

$\Delta_4=8\gamma$;

$\Delta_6=8\gamma$;

$\Delta_6=2\gamma$; and $b=\sqrt{7.24}$.

The above parameters can be seen to satisfy the detuning conditions:

$$\Delta_5 = \frac{|\Omega_C|^2}{\Delta_4}; \quad \Delta_6 = \frac{|\Omega_A|^2}{\Delta_5}; \quad \text{and} \quad |\Omega_R| \gg |\Omega_P|.$$

Other quantities used for the simulations for this rubidium level scheme were:

the dipole matrix element on the microwave transition between the $m_j=-1/2$ Zeeman sublevel of the $30S_{1/2}$ first Rydberg state and the $30P_{1/2}$ second Rydberg state is $|d_{43}|=397.83\,ea_0$, where $e$ is the elementary charge and $a_0$ is the Bohr radius; and the dipole matrix element on the near-infrared transition between the $5P_{3/2}$ excited state and the $5S_{1/2}$ ground state is $|d_6|=2.99\,ea_0$.

In FIG. 4a, which shows the intensity of the input microwave field and the output near-infrared field as a function of the depth into the atomic ensemble, a continuous wave microwave field 101 (of frequency 157 GHz) enters the atomic ensemble at a depth of z=0, with an intensity at z=0 of 18.7 μW/mm². Full conversion of the input microwave radiation 101 into near-infrared radiation 102 occurs after a length of I=186.6 $I_{abs}$, where $I_{abs}$ is the absorption length. For an atomic density of $\rho=10^{17}\,m^{-3}$, the absorption length is $I_{abs}=3.43\times10^{-2}$ mm, so full conversion occurs for I≈6.4 mm. The conversion efficiency at I=186.6 $I_{abs}$ is found to be 96.7%. The intensity of the output near-infrared field 102 (of frequency 384 THz) at I=186.6 $I_{abs}$ is found to be 42.8 nW/mm².

As will also be seen from FIG. 4a, after a depth of I=186.6 $I_{abs}$ into the atomic ensemble, the near-infrared field 102 is converted back into microwave radiation 101.

In FIG. 4b, which shows the intensity of the input near-infrared field and the output microwave field as a function of the depth into the atomic ensemble, a continuous wave near-infrared field 201 (of frequency 384 THz) enters the atomic ensemble at a depth of z=0, with an intensity at z=0 of 331.3 nW/mm². Full conversion of the input near-infrared radiation 201 into microwave radiation 202 occurs after a length of I=186.6 $I_{abs}$, where $I_{abs}$ is the absorption length. For an atomic density of ρ=$10^{17}$ m$^{-3}$, the absorption length is $I_{abs}$=3.43×$10^{-2}$ mm, so full conversion occurs for I≈6.4 mm. The conversion efficiency at I=186.6 $I_{abs}$ is found to be 96.7%. The intensity of the output microwave field 202 (of frequency 157 GHz) at I=186.6 $I_{ab}$, is found to be 126.7 µW/mm².

As will also be seen from FIG. 4b, after a depth of I=186.6 $I_{abs}$ into the atomic ensemble, the microwave field 202 is converted back into near-infrared radiation 201.

Figure 5:
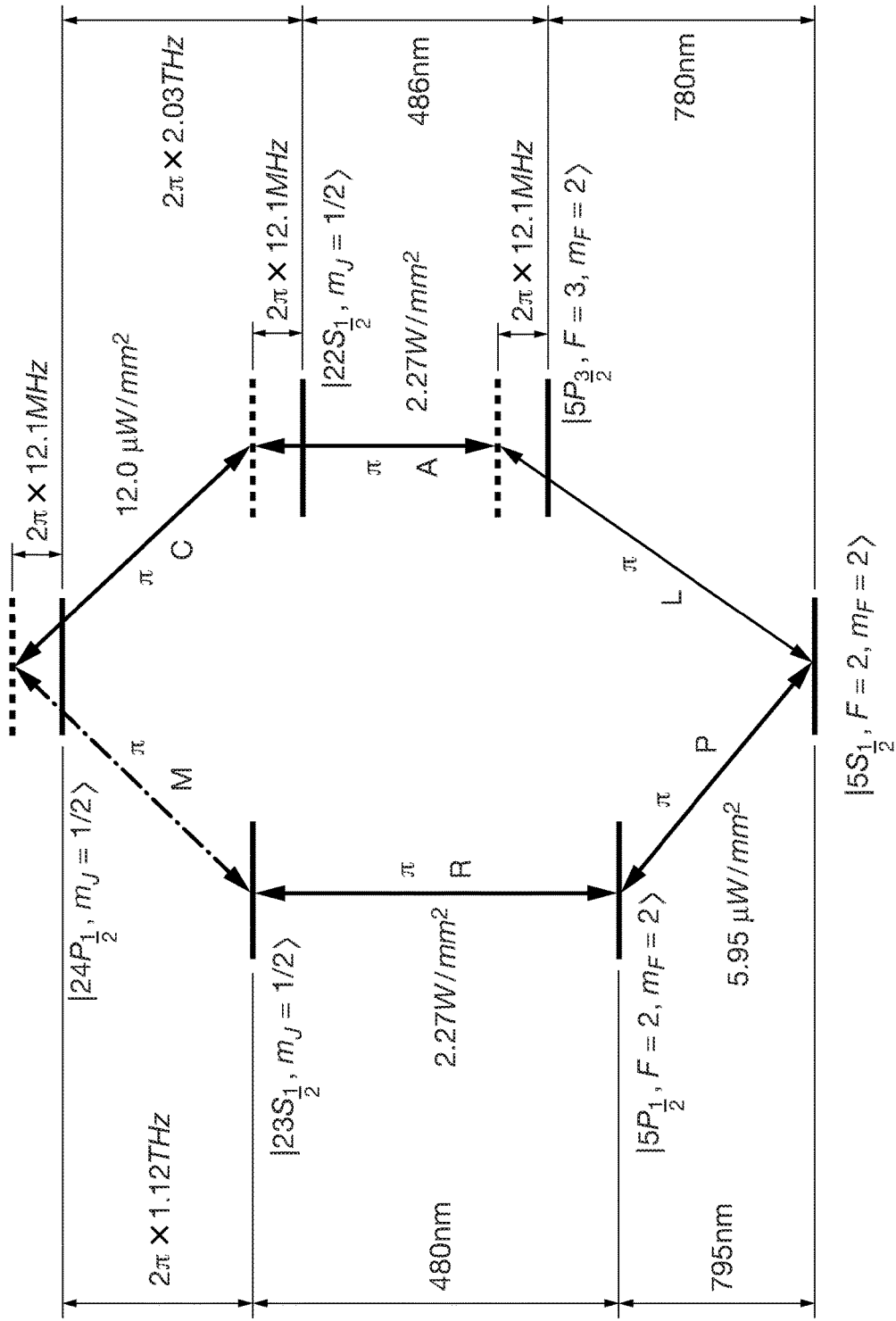
FIG. 5 shows another specific example of an atomic level scheme used in an electromagnetic frequency converter according to an embodiment of the present invention.

FIG. 5 shows another specific example of an atomic level scheme used in an electromagnetic frequency converter according to an embodiment of the present invention, when the vapour cell contains an atomic ensemble of rubidium atoms, but using different transitions to the scheme shown in FIG. 3.

This embodiment may be implemented according to the setup shown in FIG. 1, however preferably all of the fields (i.e. both the optical and the microwave (or terahertz) fields are co-propagating. Thus, in this embodiment, the input waveguide 18 is positioned to input the microwave or terahertz radiation M from the microwave or terahertz input 22 through the same input window 10 as the optical or near-infrared radiation L. Also, the output waveguide 30 is positioned to receive the output microwave or terahertz radiation from the same output window 32 as the output optical or near-infrared radiation L. Thus in this embodiment the input window 10 and the output window 32 are transparent to the frequencies of the microwave or terahertz radiation and to the frequencies of the optical or near-infrared radiation that are used.

Similar to the embodiment described with reference to FIGS. 1 and 2, the embodiment shown in FIG. 4 is able to operate in two main modes of operation: to convert terahertz radiation into near-infrared radiation and vice versa. Both modes of operation will now be described with reference to FIGS. 1 and 4.

In both modes of operation, the atomic ensemble 4 of rubidium atoms is prepared in the vapour cell 2 and the heater is energised to vaporise the rubidium atoms of the atomic ensemble 4. The first laser 6, having a frequency of approximately 617 THz, is energised and a portion of its output radiation (having an intensity of approximately 2.27 W/mm²) is separated from the rest of the laser beam and directed through the frequency shifter 12 to shift its frequency to approximately 625 THz. The remaining 617 THz radiation A (having an intensity of approximately 2.27 W/mm²) and the 625 THz radiation R from the first laser 6 are directed through the input window 10 of the vapour cell 2 so as to be incident upon the rubidium atomic ensemble 4.

The electromagnetic radiation P from the second laser 8, having a frequency of approximately 377 THz and an intensity of approximately 5.95 µW/mm², is also directed through the input window 10 of the vapour cell 2 so as to be incident upon the rubidium atomic ensemble 4.

The 377 THz radiation P from the second laser 8 excites atomic valence electrons in the atomic ensemble from their $5S_{1/2}$ ground state into an intermediate $5P_{1/2}$ excited state via an electric dipole transition. The 377 THz radiation P is resonant with the atomic transition from the $5S_{1/2}$ ground state to the intermediate $5P_{1/2}$ excited state.

The shifted 625 THz radiation R from the first laser 6 excites atomic valence electrons in the atomic ensemble from their intermediate $5P_{1/2}$ excited state into a highly excited $23S_{1/2}$ first Rydberg state via an electric dipole transition. The 625 THz radiation R is resonant with the atomic transition from the intermediate $5P_{1/2}$ excited state to the $m_J$=1/2 Zeeman sublevel of the $23S_{1/2}$ first Rydberg state.

Likewise, the 617 THz radiation A from the first laser 6 excites atomic valence electrons in the atomic ensemble from a $5P_{3/2}$ excited state to the $m_J$=+1/2 Zeeman sublevel of the excited $22S_{1/2}$ third Rydberg state via an electric dipole transition. The 617 THz radiation A is detuned from the atomic transition from the $5P_{3/2}$ excited state to the $m_J$=+1/2 Zeeman sublevel of the excited $22S_{1/2}$ third Rydberg state by 12.1 MHz at each end of the transition.

The terahertz radiation generator 14 is also energised to produce terahertz radiation C, having a frequency of approximately 2.03 THz and an intensity of 12 µW/mm², that is directed along the waveguide 18 and through the input window 10 of the vapour cell 2 so as also to be incident upon the atomic ensemble 4. This 2.03 THz radiation C excites atomic valence electrons from the $m_J$=+1/2 Zeeman sublevel of the excited $22S_{1/2}$ third Rydberg state to a higher $24P_{1/2}$ second Rydberg state via an electric dipole transition. The 2.03 THz radiation C is detuned from the atomic transition from the $m_J$=+1/2 Zeeman sublevel of the excited $22S_{1/2}$ third Rydberg state to the $24P_{1/2}$ second Rydberg state by 12.1 MHz at each end of the transition.

With the 377 THz radiation P, the 625 THz radiation R, the 617 THz radiation A and the 2.03 THz radiation C incident upon the rubidium atomic ensemble 4 in the vapour cell 2, the input electromagnetic radiation can then be input to the atomic ensemble 4 for conversion. The 377 THz radiation P and the 625 THz radiation R from the first and second lasers 6, 8 respectively create a coherence on the transition between the $S_{1/2}$ ground state and the $m_J$=1/2 Zeeman sublevel of the $23S_{1/2}$ first Rydberg state through coherent population trapping. If the electromagnetic frequency converter 1 is being used to convert terahertz radiation into near-infrared radiation, the terahertz radiation M (having a frequency of approximately 1.12 THz) is input from the terahertz input 22 and directed along the waveguide 18 and through the input window 10 of the vapour cell 2 so as to be incident upon the atomic ensemble 4. Upon incidence on the atomic ensemble 4, the terahertz radiation M couples to the electric dipole transition between the $m_J$=1/2 Zeeman sublevel of the $23S_{1/2}$ first Rydberg state and the $24P_{1/2}$ second Rydberg state (from which it is detuned by 12.1 MHz).

When the 1.12 THz terahertz radiation M is input, this creates a coherence on the near-infrared frequency transition between the $5P_{3/2}$ excited state and the $S_{1/2}$ ground state, but not on the terahertz frequency transition between the $m_J$=1/2 Zeeman sublevel of the $23S_{1/2}$ first Rydberg state and the $24P_{1/2}$ second Rydberg state (which is suppressed through quantum interference). As a result, the input 1.12 THz terahertz radiation M is converted into near-infrared radiation (having a frequency of approximately 384 THz, which is detuned from the transition between the $5P_{3/2}$ excited state and the $S_{1/2}$ ground state by 12.1 MHz). This 384 THz near-infrared radiation is then output from the atomic ensemble 4 through the output window 32 in the vapour cell 2 that is transparent to the 384 THz near-infrared radiation, where it is received by the near-infrared radiation output 26.

If the electromagnetic frequency converter 1 is being used to convert near-infrared radiation into terahertz radiation, the 384 THz near-infrared radiation L (is input from the optical input 20 and directed through the input window 10 (that is transparent to radiation of such frequency) of the vapour cell 2 so as to be incident upon the atomic ensemble 4. Upon incidence on the atomic ensemble 4, the 384 THz radiation L couples to the electric dipole transition between the $5P_{3/2}$ excited state and the $S_{1/2}$ ground state, with the frequency of the 384 THz input radiation L being detuned from the transition by 12.1 MHz.

When the 384 THz radiation L is input, this creates a coherence on the terahertz transition between the $m_j=1/2$ Zeeman sublevel of the $23S_{1/2}$ first Rydberg state and the $24P_{1/2}$ second Rydberg state, but not on the 384 THz optical transition between the $5P_{3/2}$ excited state and the $S_{1/2}$ ground state (which is suppressed through quantum interference). As a result, the input 384 THz radiation L is converted into terahertz radiation (having a frequency of approximately 1.12 THz, which is detuned from the transition between the $m_j=1/2$ Zeeman sublevel of the $23S_{1/2}$ first Rydberg state and the $24P_{1/2}$ second Rydberg state by 12.1 MHz). This 1.12 THz terahertz radiation is then output from the atomic ensemble 4 through the output window 32 in the vapour cell 2 that is transparent to the frequency of the 1.12 THz terahertz radiation, where it is received by the terahertz radiation output 24 via the output waveguide 30.

Figure 6A:
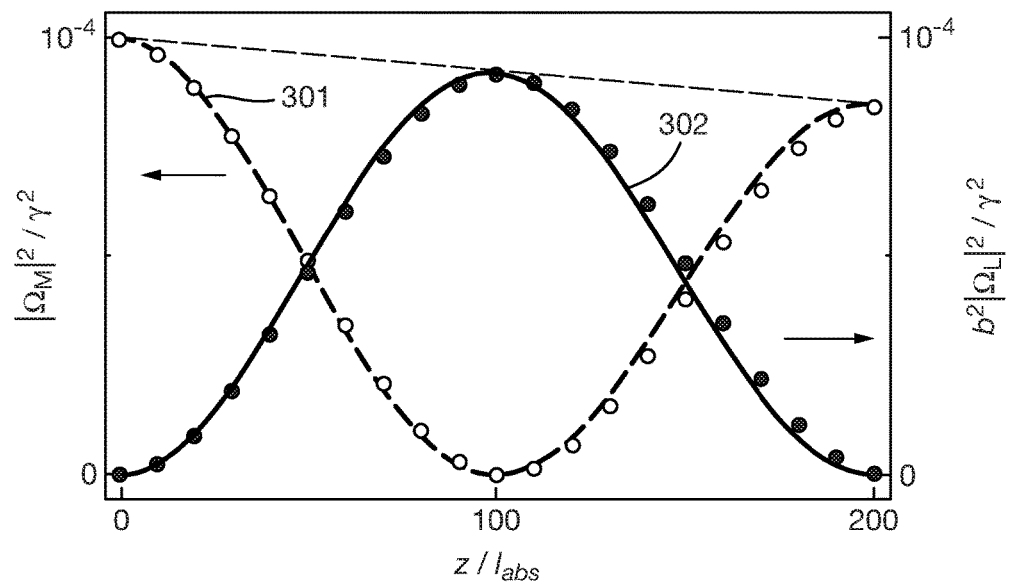
FIGS. 6a and 6b show simulation plots of the intensities of input electromagnetic radiation frequencies into the embodiment of the electromagnetic frequency converter operated according to the atomic level scheme shown in FIG. 3.
Figure 6B:
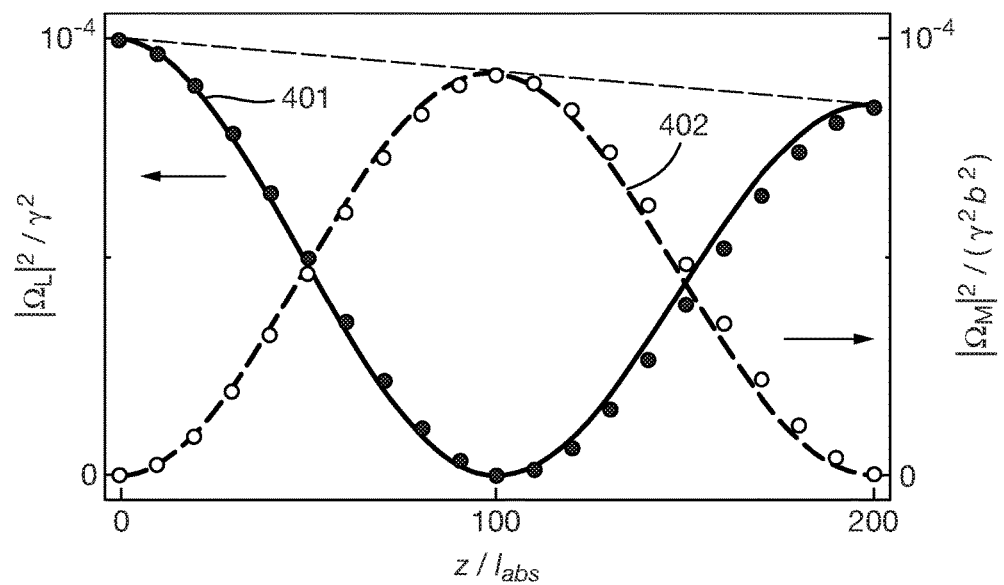

FIGS. 6 and 6b show simulation plots of the intensities of input electromagnetic radiation frequencies into the embodiment of the electromagnetic frequency converter operated according to the atomic level scheme shown in FIG. 5. The efficiency of the electromagnetic wavelength converter according to the scheme shown in FIG. 5 will now be described with reference to the plots shown in FIGS. 6a and 6b. The dots in the plots indicate the results from a numerical integration of the Maxwell-Bloch equations.

The parameters used in the simulations were:

$\Gamma/\gamma=1/285$, where $\Gamma$ is the lifetime of the $23S_{1/2}$ first Rydberg state, and $\gamma$ is the lifetime of the intermediate $5P_{1/2}$ excited state;

$\Omega_A=2\gamma$, where $\Omega_A$ is the Rabi frequency of the 617 THz radiation A from the first laser 6;

$\Omega_C=2\gamma$, where $\Omega_C$ is the Rabi frequency of the 1.12 THz radiation C from the terahertz generator 14;

$\Omega_R=2\gamma$, where $\Omega_R$ is the Rabi frequency of the shifted 625 THz radiation R from the first laser 6;

$\Omega_P=0.3\gamma$, where $\Omega_P$ is the Rabi frequency of the 377 THz radiation P from the second laser 8;

$\Delta_4=2\gamma$;
$\Delta_6=2\gamma$;
$\Delta_6=2\gamma$; and
$b=\sqrt{0.72}$.

The above parameters can be seen to satisfy the detuning conditions:

$$\Delta_5 = \frac{|\Omega_C|^2}{\Delta_4}; \quad \Delta_6 = \frac{|\Omega_A|^2}{\Delta_5}; \text{ and } |\Omega_R| \gg |\Omega_P|.$$

Other quantities used for the simulations for this rubidium level scheme were:

the dipole matrix element on the terahertz transition between the $m_j=1/2$ Zeeman sublevel of the $23S_{1/2}$ first Rydberg state and the $24P_{1/2}$ second Rydberg state is $|d_{43}|=27.03 ea_0$, where e is the elementary charge and $a_0$ is the Bohr radius; and the dipole matrix element on the near-infrared transition between the $5P_{3/2}$ excited state and the $S_{1/2}$ ground state is $|d_{61}|=1.73 ea_0$.

In FIG. 6a, which shows the intensity of the input terahertz field and the output near-infrared field as a function of the depth into the atomic ensemble, a continuous wave terahertz field 301 (of frequency 1.12 THz) enters the atomic ensemble at a depth of z=0, with an intensity at z=0 of 40.5 µW/mm². Full conversion of the input terahertz radiation 301 into near-infrared radiation 302 occurs after a length of $I=100 I_{abs}$, where $I_{abs}$ is the absorption length. For an atomic density of $\rho=2\times10^{17}$ m$^{-3}$, the absorption length is $I_{abs}=5.1\times10^{-2}$ mm, so full conversion occurs for I≈5.1 mm. The conversion efficiency at $I=100 I_{abs}$ is found to be 92.1%. The intensity of the output near-infrared field 302 (of frequency 384 THz) at $I=100 I_{abs}$ is found to be 11.8 nW/mm².

As will also be seen from FIG. 6a, after a depth of $I=100 I_{abs}$ into the atomic ensemble, the near-infrared field 302 is converted back into terahertz radiation 301.

In FIG. 6b, which shows the intensity of the input near-infrared field and the output terahertz field as a function of the depth into the atomic ensemble, a continuous wave near-infrared field 401 (of frequency 384 THz) enters the atomic ensemble at a depth of z=0, with an intensity at z=0 of 9.94 nW/mm². Full conversion of the input near-infrared radiation 401 into terahertz radiation 402 occurs after a length of $I=100 I_{abs}$, where $I_{abs}$ is the absorption length. For an atomic density of $\rho=2\times10^{17}$ m$^{-3}$, the absorption length is $I_{abs}=5.1\times10^{-2}$ mm, so full conversion occurs for I≈5.1 mm. The conversion efficiency at $I=100 I_{abs}$ is found to be 92.1%. The intensity of the output terahertz field 402 (of frequency 1.12 THz) at $I=100 I_{abs}$ is found to be 24.5 µW/mm².

As will also be seen from FIG. 6b, after a depth of $I=100 I_{abs}$ into the atomic ensemble, the terahertz field 402 is converted back into near-infrared radiation 401.

It can be seen from the above that in at least preferred embodiments of the invention, an electromagnetic frequency converter is provided that offers an efficient frequency conversion mechanism between optical or near-infrared radiation and microwave or terahertz frequency radiation (or vice versa). Such a converter does not require the use of a cavity, thus offering a greater bandwidth for conversion frequencies. Furthermore, the converter does not require any optical pumping because the highly excited Rydberg states are unpopulated at room temperature so there is no thermal noise to suppress, and does not require any micro-fabrication of components because the active component of the converter is simply a volume of atoms to which radiation is applied.

Although the embodiments shown in the Figures use four drive fields, i.e. three optical or near-infrared fields and one microwave field, to perform the conversion, it will be appreciated that the transition from the ground state |1> to the first Rydberg state |3> may be performed using only a single drive field or using three or more drive fields via two or more intermediate states through respective transitions. Similarly, the transition from the excited state |6> to the second Rydberg state |4> may be performed using only a single drive field or using three or more drive fields via two or more intermediate states through respective transitions.

The work leading to this invention has received funding from the European Research Council under the European Union's Seventh Framework Programme (FP7/2007-2013)/ERC grant agreement no. 319286. The support of the National University of Singapore with this work is also acknowledged.

The invention claimed is:

1. An electromagnetic frequency converter for converting input electromagnetic radiation to output electromagnetic radiation of a different frequency, the electromagnetic frequency converter comprising:

an atomic ensemble;

one or more first sources of electromagnetic radiation each having a frequency selected from a set of possible atomic transition frequencies for the atomic valence electrons in the atomic ensemble, wherein the sum of the frequencies of the one or more first sources is between 600 THz and 1500 THz, wherein the electromagnetic radiation from the one or more first sources is arranged to be incident upon the atomic ensemble to excite atomic valence electrons in the atomic ensemble from a ground state to a first Rydberg state;

one or more second sources of electromagnetic radiation each having a frequency selected from a set of possible atomic transition frequencies for the atomic valence electrons in the atomic ensemble, wherein the sum of the frequencies of the one or more second sources is between 300 THz and 750 THz, wherein the electromagnetic radiation from the one or more second sources is arranged to be incident upon the atomic ensemble to excite atomic valence electrons in the atomic ensemble from an excited state to a second Rydberg state, wherein the excited state is linked to the ground state by an atomic transition having a frequency between 193 THz and 800 THz for the atomic valence electrons in the atomic ensemble, and the second Rydberg state is linked to the first Rydberg state by an atomic transition having a frequency between 300 MHz and 3 THz for the atomic valence electrons in the atomic ensemble;

a first input and/or output for electromagnetic radiation having a frequency between 193 THz and 800 THz, wherein the first input or output is arranged to be coupled to the atomic ensemble such that the electromagnetic radiation is incident upon the atomic ensemble from the first input or received from the atomic ensemble at the first output; and a second input and/or output for electromagnetic radiation having a frequency between frequency between 300 MHz and 3 THz, wherein the second input or output is arranged to be coupled to the atomic ensemble such that the electromagnetic radiation is incident upon the atomic ensemble from the second input or received from the atomic ensemble at the second output;

wherein the electromagnetic frequency converter is arranged such that on application of the one or more first and one or more second sources of electromagnetic radiation to be incident upon the atomic ensemble, input of electromagnetic radiation having a frequency between 193 THz and 800 THz from the first input and which couples to the atomic transition between the ground state and the excited state or input of electromagnetic radiation having a frequency between 300 MHz and 3 THz from the second input and which couples to the atomic transition between the first Rydberg state and the second Rydberg state, causes electromagnetic radiation having a frequency between 300 MHz and 3 THz from the atomic transition between the second Rydberg state and the first Rydberg state to be output from the second output or electromagnetic radiation having a frequency between 193 THz and 800 THz from the atomic transition between the excited state and the ground state to be output from the first output respectively.

2. The electromagnetic frequency converter of claim 1, wherein the one or more first sources of electromagnetic radiation comprise:

one or more first sources of electromagnetic radiation each having a frequency selected from a set of possible atomic transition frequencies for the atomic valence electrons in the atomic ensemble, wherein the sum of the frequencies of the one or more first sources is between 193 THz and 800 THz, wherein the electromagnetic radiation from the one or more first sources is arranged to be incident upon the atomic ensemble to excite atomic valence electrons in the atomic ensemble from a ground state to an intermediate excited state; and one or more third sources of electromagnetic radiation each having a frequency selected from a set of possible atomic transition frequencies for the atomic valence electrons in the atomic ensemble, wherein the sum of the frequencies of the one or more third sources is between 193 THz and 800 THz, wherein the electromagnetic radiation from the one or more third sources is arranged to be incident upon the atomic ensemble to excite atomic valence electrons in the atomic ensemble from the intermediate excited state to the first Rydberg state.

3. The electromagnetic frequency converter of claim 2, wherein the intermediate excited state of the valence electrons in the atomic ensemble that is reached by excitation by the one or more first sources and the excited state of the valence electrons in the atomic ensemble that is reached by excitation by the first input have the same principal quantum number but comprise a different hyperfine state.

4. The electromagnetic frequency converter of claim 2, wherein when the electromagnetic frequency converter comprises a first source, a second source, a third source and a fourth source, the frequencies and intensities of the electromagnetic radiation from the first, second, third and fourth sources satisfy the following conditions:

$$\Delta_5 = \frac{|\Omega_4|^2}{\Delta_4}; \quad \Delta_6 = \frac{|\Omega_{2a}|^2}{\Delta_5}; \text{ and } |\Omega_3| \gg |\Omega_1|,$$

where $\Omega_1$ is the Rabi frequency of the electromagnetic radiation from the first source, $\Omega_2$ is the Rabi frequency of the electromagnetic radiation from the second source, $\Omega_3$ is the Rabi frequency of the electromagnetic radiation from the third source, $\Omega_4$ is the Rabi frequency of the electromagnetic radiation from the fourth source, $\Delta_4$-$\Delta_5$ is the detuning of the electromagnetic radiation from the fourth source from the atomic transition between the third Rydberg state and the second Rydberg state, and $\Delta_5$-$\Delta_6$ is the detuning of the electromagnetic radiation from the second source from the atomic transition between the third Rydberg state and the excited state.

5. The electromagnetic frequency converter of claim 1, wherein the one or more second sources of electromagnetic radiation comprise:

one or more second sources of electromagnetic radiation each having a frequency selected from a set of possible atomic transition frequencies for the atomic valence electrons in the atomic ensemble, wherein the sum of the frequencies of the one or more second sources is between 300 THz and 750 THz, wherein the electromagnetic radiation from the one or more second sources is arranged to be incident upon the atomic ensemble to excite atomic valence electrons in the atomic ensemble from an excited state to a third Rydberg state; and one or more fourth sources of electromagnetic radiation each having a frequency selected from a set of possible atomic transition frequencies for the atomic valence electrons in the atomic ensemble, wherein the sum of the frequencies of the one or more fourth sources is between 300 MHz and 3 THz, wherein the electromagnetic radiation from the one or more fourth sources is arranged to be incident upon the atomic ensemble to excite atomic valence electrons in the atomic ensemble from the third Rydberg state to the second Rydberg state.

6. The electromagnetic frequency converter of claim 5, wherein the one or more fourth sources comprises a microwave or terahertz radiation generator and a waveguide arranged to couple the microwave or terahertz radiation generated by the microwave or terahertz radiation generator to the atomic ensemble so that the microwave or terahertz radiation is incident upon the atomic ensemble.

7. The electromagnetic frequency converter of claim 1, wherein the atomic ensemble comprises alkali metal atoms.

8. The electromagnetic frequency converter of claim 1, wherein the atomic ensemble comprises rubidium atoms, caesium atoms or sodium atoms.

9. The electromagnetic frequency converter of claim 1, further comprising a vapour cell within which the atomic ensemble is held.

10. The electromagnetic frequency converter of claim 9, wherein the vapour cell comprises an input window transparent to the electromagnetic radiation from one or more of: the one or more first sources of electromagnetic radiation, the one or more second sources of electromagnetic radiation, the first input for electromagnetic radiation and the second input for electromagnetic radiation, which are arranged to direct the respective electromagnetic radiation therefrom through the input window so to be incident upon the atomic ensemble.

11. The electromagnetic frequency converter of claim 9, wherein the vapour cell comprises an output window transparent to the electromagnetic radiation from one or both of the first output for electromagnetic radiation and the second output for electromagnetic radiation, where are arranged to receive the electromagnetic radiation from the atomic ensemble through the output window.

12. The electromagnetic frequency converter of claim 9, wherein the electromagnetic frequency converter comprises a heater in good thermal communication with the vapour cell and arranged to heat the atomic ensemble.

13. The electromagnetic frequency converter of claim 1, wherein one or more of the one or more first sources and the one or more second sources of electromagnetic radiation comprises a laser.

14. The electromagnetic frequency converter of claim 1, wherein the second output comprises a waveguide arranged to collect the electromagnetic radiation having a frequency between 0.1 mm and 1 m output from the atomic ensemble.

15. The electromagnetic frequency converter of claim 1, wherein one or more of the transitions of the atomic valence electrons are electric dipole transitions.

16. The electromagnetic frequency converter of claim 1, wherein the transitions between the ground state and the excited state of the valence electrons in the atomic ensemble are at least one of the D-lines transitions.

17. The electromagnetic frequency converter of claim 1, wherein the first and second Rydberg states have a principal quantum number between 20 and 80.

18. The electromagnetic frequency converter of claim 1, wherein the first Rydberg state and the second Rydberg state have the same principal quantum number but comprise one or more of a different azimuthal quantum number and a different orbital angular momentum quantum number.

19. The electromagnetic frequency converter of claim 1, wherein when the input electromagnetic radiation is input from the second input, the difference in the frequency of the second input electromagnetic radiation and the frequency of the atomic transition between the first and second Rydberg states of the valence electrons of the atomic ensemble is much less than the frequency of the transition between the first and second Rydberg states itself.

20. The electromagnetic frequency converter of claim 1, wherein when the electromagnetic radiation is input from the first input, the difference in the frequency of the first input electromagnetic radiation and the frequency of the atomic transition between the ground and excited state of the valence electrons of the atomic ensemble is much less than the frequency of the transition between the ground and excited states itself.

21. A method of converting input electromagnetic radiation to output electromagnetic radiation of a different frequency, the method comprising:
exciting atomic valence electrons in an atomic ensemble from a ground state to a first Rydberg state by arranging for electromagnetic radiation from one or more first sources of electromagnetic radiation to be incident upon the atomic ensemble, wherein the frequency of each of the one or more first sources of electromagnetic radiation is selected from a set of possible atomic transition frequencies for the atomic valence electrons in the atomic ensemble and the sum of the frequencies of the one or more first sources is between 600 THz and 1500 THz;
exciting atomic valence electrons in the atomic ensemble from an excited state to a second Rydberg state by arranging for electromagnetic radiation from one or more second sources of electromagnetic radiation to be incident upon the atomic ensemble, wherein the excited state is linked to the ground state by an atomic transition having a frequency between 193 THz and 800 THz for the atomic valence electrons in the atomic ensemble, and the second Rydberg state is linked to the first Rydberg state by an atomic transition having a frequency between 300 MHz and 3 THz for the atomic valence electrons in the atomic ensemble, and wherein the frequency of each of the one or more second sources of electromagnetic radiation is selected from a set of possible atomic transition frequencies for the atomic valence electrons in the atomic ensemble and the sum of the frequencies of the one or more second sources is between 300 THz and 750 THz;
inputting electromagnetic radiation having a frequency between 193 THz and 800 THz or between 300 MHz and 3 THz to the atomic ensemble such that the electromagnetic radiation is incident upon the atomic ensemble;
wherein the atomic ensemble is arranged such that on application of the one or more first and one or more second sources of electromagnetic radiation to be incident upon the atomic ensemble, input of electromagnetic radiation having a frequency between 193 THz and 800 THz from the first input and which couples to the atomic transition between the ground state and the excited state or input of electromagnetic radiation having a frequency between 300 MHz and 3 THz from the second input and which couples to the transition between the first Rydberg state and the second Rydberg state, causes electromagnetic radiation having a frequency between 300 MHz and 3 THz from the atomic transition between the second Rydberg state and the first Rydberg state or electromagnetic radiation having a frequency between 193 THz and 800 THz from the atomic transition between the excited state and the ground state to be output from the atomic ensemble.

* * * * *